United States Patent
Mitchell et al.

(10) Patent No.: US 6,672,145 B2
(45) Date of Patent: Jan. 6, 2004

(54) APPARATUS AND METHOD FOR TESTING JET ENGINE FUEL MANIFOLD FLOW DISTRIBUTION

(75) Inventors: Robert D. Mitchell, Scottsdale, AZ (US); John R. Webber, Clarksburg, CA (US); Joseph M. Oloffo, Phoenix, AZ (US); Michael S. Englund, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 11 days.

(21) Appl. No.: 09/960,897

(22) Filed: Sep. 21, 2001

(65) Prior Publication Data

US 2003/0056578 A1 Mar. 27, 2003

(51) Int. Cl.[7] .............................................. G01M 15/00
(52) U.S. Cl. ..................................... 73/118.1; 73/119 A
(58) Field of Search ............................... 73/116, 117.2, 73/117.3, 118.1, 118.2, 117.4, 119 R, 119 A

(56) References Cited

U.S. PATENT DOCUMENTS

| | | | |
|---|---|---|---|
| 3,478,580 A | 11/1969 | Siemietkowski et al. | |
| 3,745,818 A | 7/1973 | Gaenzler | |
| 4,286,324 A | * 8/1981 | Ingram | 701/123 |
| 4,428,228 A | 1/1984 | Banzhaf et al. | |
| 4,508,127 A | * 4/1985 | Thurston | 137/8 |
| 4,788,858 A | 12/1988 | Liebermann | |
| 5,571,959 A | 11/1996 | Griggs | |
| 5,689,066 A | 11/1997 | Stevenson | |
| 5,790,420 A | * 8/1998 | Lang | 700/287 |
| 5,795,998 A | 8/1998 | Smith | |
| 6,148,677 A | * 11/2000 | Evangelista | 73/861.02 |
| 2001/0013247 A1 | * 8/2001 | Wilson et al. | 73/54.01 |

* cited by examiner

*Primary Examiner*—Eric S. McCall
(74) *Attorney, Agent, or Firm*—Robert Desmond, Esq.

(57) ABSTRACT

An apparatus and method for testing the flow distribution through a turbine engine fuel manifold and one or more nozzles connected to the manifold. A plurality of individual fluid measurement vessels, at least one for each of the nozzles being tested, collects test fluid pumped through the manifold and the connected nozzles. The level in each of the measurement vessels is periodically sampled during the test. The test fluid flow rate through each of the nozzles is periodically determined based on the periodically sampled levels.

54 Claims, 14 Drawing Sheets

FIG. 11

```
TFE FUEL MANIFOLD ACCEPTANCE TEST DATA SHEET
R/O No. T1017-2
REFERENCE CMM 73-10-31

P/N 3071101-13,15    S/N:8-131    TECHNICIAN: ROB MITCHELL    TEST DATE: 10/17/2000

Nozzel
Condition Test Press. Units Required   1      2      3      4      5      6      7      8      9      10     11     12
          (PSIG)      Value
Primary   100.0       Final    1037.7 1048.3 1038.3 1034.0 1030.7 1055.4 1049.3 1033.6 1036.3 1042.9 1052.3 1044.4
  +/-1.0              Initial   36.0   34.9   35.3   33.3   33.5   36.3   31.9   38.0   38.2   37.8   32.0   37.9
                      Diff.    1001.7 1013.4 1003.0 1000.8  997.2 1019.1 1017.4  995.6  998.2 1005.1 1020.3 1006.5
          Spray
          %Diff. 8.0%Max  Actual=2.42%
          Flow     112.7-130.5   Actual=1754.6 pph
          Recipe Max 130.5 145.5 147.2 145.7 145.4 144.9 148.0 147.8 144.6 145.0 146.0 48.2 146.2

Secondary 100.0       Final    1034.3 1063.0 1037.3 1032.0 1037.3 1032.0 1054.5 1054.2 1035.9 1040.0 1046.4 1062.0 1040.1
  +/-1.0              Initial   35.6   36.7   34.6   30.7   35.2   36.5   34.6   38.1   40.0   31.4   39.6   32.2
                      Diff.     998.7 1026.3  997.4 1006.6  996.8 1018.0 1019.6  997.8 1000.0 1015.0 1022.5 1007.9
          Spray
          %Diff. 8.0%Max  Actual=2.87%
          Flow     735.0-825.0   Actual=1754.1 pph
          Recipe Max 825.0 144.7 148.7 144.5 145.9 144.4 147.5 147.7 144.6 144.9 147.1 148.1 146.0

Combined Primary Final    1038.4 1061.2 1036.0 1034.4 1032.1 1052.9 1052.9 1034.7 1037.3 1046.1 1059.6 1042.2
Flow     600.0   Initial   39.0   47.1   38.1   31.4   34.9   38.6   40.3   38.3   38.8   43.7   40.5   35.3
  +/-1.0         Diff.     999.4 1014.0  997.9 1003.0  997.2 1014.2 1012.6  996.4  998.5 1002.4 1019.1 1006.9
         Spray           %Diff. 8.0%Max  Actual=2.22%
         Secondary   Flow  1661.0-1852.0   Actual=1754.5 pph
  +/-1.0 Recipe Max 1852.0 145.4 147.5 145.2 145.9 145.1 147.5 147.3 144.9 145.2 145.8 148.2 146.5
```

FIG. 13

APPARATUS AND METHOD FOR TESTING JET ENGINE FUEL MANIFOLD FLOW DISTRIBUTION

BACKGROUND OF THE INVENTION

The present invention relates to an apparatus and method for testing jet engine fuel manifolds and, more particularly, to an apparatus and method for testing the flow distribution in jet engine fuel manifolds.

Modern jet aircraft use turbofan jet engines to generate the thrust that moves the aircraft on the ground and through the air. One of the major components of the turbofan engine is the combustor. The combustor receives compressed air from the compression portion of the engine, mixes the air with fuel supplied from fuel injector nozzles, and ignites the fuel/air mixture in a combustion chamber, thereby significantly increasing the energy of the air flowing through the engine. The high-energy air exiting the combustor expands through a turbine, which drives the compressor, and through a nozzle, to provide thrust.

The fuel injector nozzles that supply the fuel to the combustion chamber are coupled to a manifold that is located circumferentially around the engine. If fuel flow through the injector nozzles is uneven, for example if fuel flow through one or more of the fuel injector nozzles is significantly higher than other nozzles, large temperature variations in the hot gas that exits the combustor and impinges upon the turbine will result. These large temperature variations cause unwanted stresses in the turbine, which leads to early replacement of costly turbine components, including the combustors, transition liners, and turbine nozzles Uneven fuel flow through the injector nozzles is caused by various defects. For example, if a portion of the manifold, or one or more of the injector nozzles, becomes clogged, then fuel flow through the remaining injector nozzles will be higher than the others. Additionally, after usage one or more of the injector nozzles may wear, resulting in a larger nozzle opening than the other injector nozzles coupled to the manifold.

In order to check for uneven fuel manifold flow distribution, the fuel injector manifolds are periodically removed from the engines and subject to flow distribution testing. Presently, this testing is conducted using one of two known test devices. One of these test devices consists of a test stand that includes one measurement vessel for each injector nozzle. To conduct the test, the fuel manifold and injector nozzles are removed from the engine and are connected to the test stand. A test fluid is then pumped into the manifold and through the injector nozzles, and a predetermined minimum volume of test fluid is collected in each of the individual measurement vessels. After the predetermined volume is collected, test fluid flow is stopped and an operator observes how much fluid is collected in each of the individual measurement vessels. The operator then compares the volumes accumulated from each nozzle and calculates the flow distribution as [(max−min)/max]×100, to ensure this is below the limit.

Another known test device also consists of a test stand that includes a measurement vessel for each injector nozzle. However, each of the measurement vessels has a pair of associated optical level sensors. To test a fuel manifold with this device, the fuel manifold and injector nozzles are removed from the engine and are connected to the test stand. A test fluid is then pumped into the manifold and through the injector nozzles, and is collected in each of the individual measurement vessels. As the rising level in each vessel passes the lower optical sensor, a high frequency clock begins counting; as the level reaches the upper optical sensor, the clock stops, and test fluid flow is stopped. A computer determines the flow rate through each of the nozzles based on the time required to fill each vessel to a known volume.

Each of the above-described methods and apparatuses for testing fuel manifold flow distribution has its disadvantages. The first test device and method exhibits a large measurement uncertainty (e.g., +/−2% repeatability), due in large part to the operator subjectivity in the measurement and to the coarse graduations of the measuring vessels. This large amount of uncertainty limits the ability of engine maintenance and testing facilities to accurately determine when fuel distribution manifolds are actually exhibiting uneven flow distribution. Although the second test device alleviates the operator subjectivity somewhat, it still suffers numerous disadvantages. For example, the measurement vessels used with this device are opaque and, therefore, do not allow an operator to view the spray pattern of the test fuel as it exits the injector nozzles. In addition, the level sensors used in the device do not provide real-time level sensing and display throughout the test. Thus, an operator will not be able to clearly detect a fault in the system and abort the test, until after the predetermined time period has elapsed. In addition, the device is not configured as a closed loop system, which means that the test fluid pumped through the fuel manifold and into the measurement vessels is not conveniently drained or pumped back to the reservoir from where it originated.

Hence, there is a need for a fuel distribution manifold test device and method that improves upon one or more of the drawbacks identified above. Namely, a device and method that provides increased accuracy and repeatability, and/or provides real-time level sensing and display throughout the test, and/or allows operators to view the fuel nozzle spray patterns during the test, and/or is provided in a closed loop system configuration.

SUMMARY OF THE INVENTION

The present invention relates to an apparatus and method for testing the flow distribution through a turbine engine fuel manifold and one or more nozzles connected to the manifold. One embodiment of the present invention allows an operator to view individual measurement vessel levels, view real-time flow data through each of the nozzles, and simultaneously view the fuel nozzle spray patterns throughout the test.

In one aspect of the present invention, an apparatus for testing fluid flow distribution through a turbine engine fuel manifold and one or more fuel nozzles connected thereto includes a test fluid supply tank, one or more test fluid supply lines, a plurality of fluid measurement vessels, a plurality of level sensors, and a computer. The test fluid supply lines each include a test fluid inlet in fluid communication with the test fluid supply tank and a test fluid outlet adapted to be coupled to the fuel manifold and its connected fuel nozzles. The plurality of fluid measurement vessels are each operable to receive a test fluid discharged from one of the fuel nozzles when the fuel manifold is coupled to the test fluid supply line outlet. The plurality of level sensors are individually coupled to each of the fluid measurement vessels and are operable to determine a level of the test fluid therein and generate a level signal representative of the test fluid level. The computer is coupled to the one or more level sensors and is operable to periodically sample each of the generated level signals and calculate test fluid flow rate through each of the fuel nozzles based on the sampled level signals.

In another aspect of the present invention, a method of testing fluid flow distribution through a turbine engine fuel manifold and one or more fuel nozzles connected thereto includes supplying a test fluid to the fuel manifold at a predetermined pressure, and collecting the test fluid discharged from each of the fuel nozzles in separate measurement vessels. The volume of test fluid discharged from each of the fuel nozzles is periodically determined until each of the measurement vessels have collected a predetermined volume of the test fluid. The test fluid flow rate through each of the fuel nozzles is periodically calculated based on the periodically determined test fluid discharge volume.

In yet another aspect of the present invention, a computer-readable storage medium containing computer executable code for instructing a computer, which is coupled to a test stand that is configured to test fluid flow distribution through a turbine engine fuel manifold and one or more fuel nozzles, and that includes a plurality of fluid measurement vessels each operable to receive a test fluid discharged from one of the fuel nozzles, to perform the steps of periodically determining and displaying a volume of test fluid discharged from each of the fuel nozzles until each of the measurement vessels have collected a predetermined volume of the test fluid, and periodically calculating and displaying test fluid flow rate through each of the fuel nozzles based on the periodically determined test fluid discharge volume.

Other independent features and advantages of the preferred sensor will become apparent from the following detailed description, taken in conjunction with the accompanying drawings which illustrate, by way of example, the principles of the invention.

BRIEF DESCRIPTION OF THE DRAWINGS

FIG. 11 illustrates an exemplary user interface screen display provided on a display device which forms a portion of the control unit depicted in FIG. 7;

FIG. 13 depicts an example of the content and format of a computer printout providing the results of the testing processes depicted in FIGS. 12A and 12B.

DETAILED DESCRIPTION OF PREFERRED EMBODIMENTS

Figure 1:
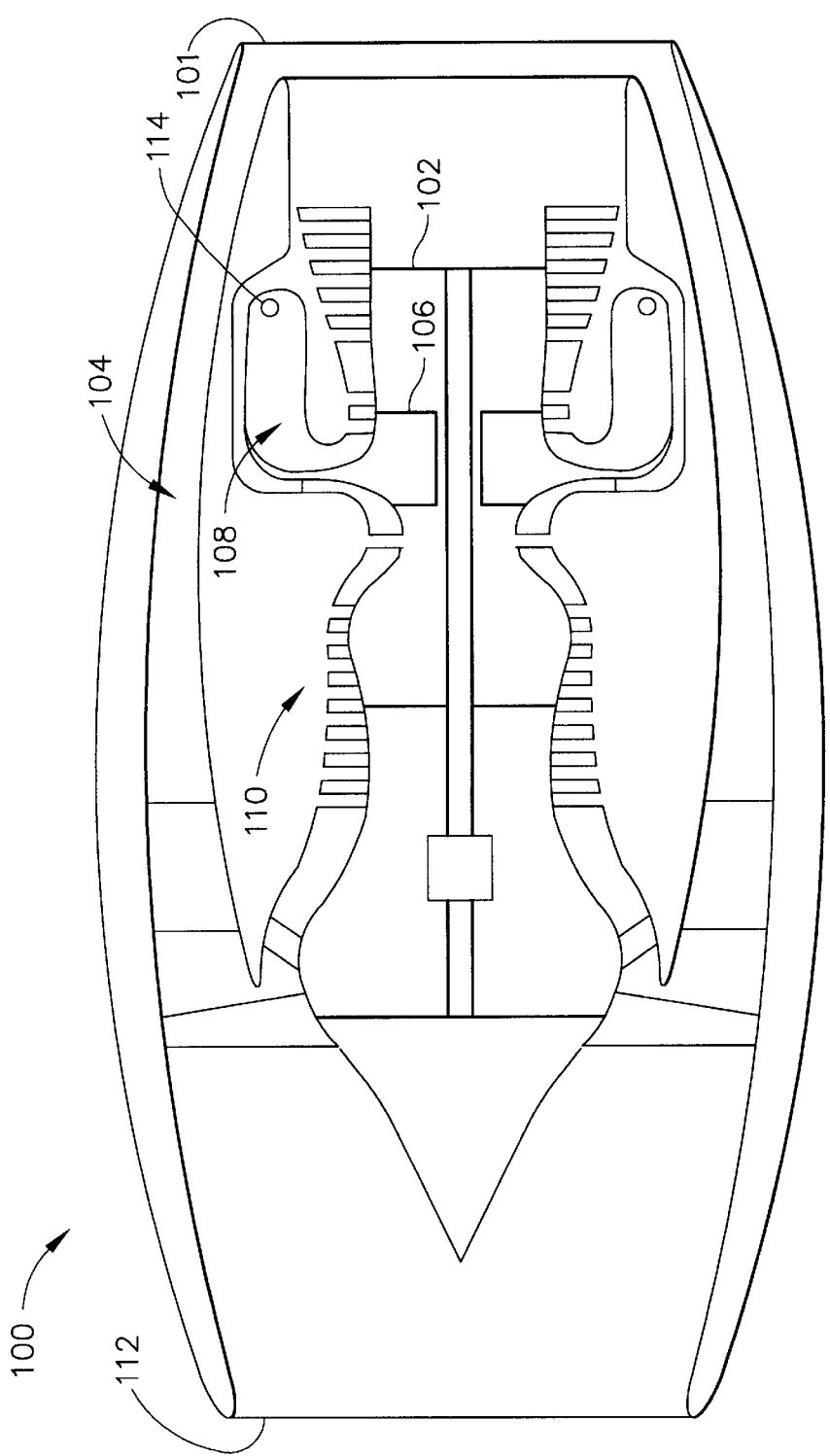
FIG. 1 is a simplified schematic cross section view of a turbofan jet engine.

A simplified schematic cross section view of a turbofan jet engine is depicted in FIG. 1. As this figure illustrates, a turbofan jet engine 100 consists of six major parts or sections. These major parts or sections are a turbofan 102, a bypass section 104, a compressor 106, a combustor 108, a turbine section 110, and an outlet nozzle 112.

The turbofan 102 is positioned at the front, or "inlet" section 101 of the engine 100, and induces air from the surrounding environment into the engine 100. The turbofan 102 accelerates a fraction of this air into and through the bypass section 104, and out the outlet nozzle 112. The remaining fraction of air that is not directed through the bypass section 104 is directed toward the compressor 106, which raises the pressure of the air to a relatively high level. This high-pressure compressed air then enters the combustor 108, where a ring of fuel injector nozzles 114 injects a steady stream of fuel. The injected fuel is ignited by a burner (not shown), which significantly increases the energy of the high-pressure compressed air.

The high-energy compressed air then flows from the combustor 108 into the turbine section 110, causing rotationally mounted turbine blades 111 to turn and generate energy. The energy generated in the turbine section 110 is used to power other portions of the engine 100, such as the turbofan 102 and compressor 106. The air exiting the turbine section 110 then leaves the engine 100 via the outlet nozzle 112. The energy remaining in this exhaust air aids the thrust generated by the air flowing through the bypass section 104.

Figure 2:
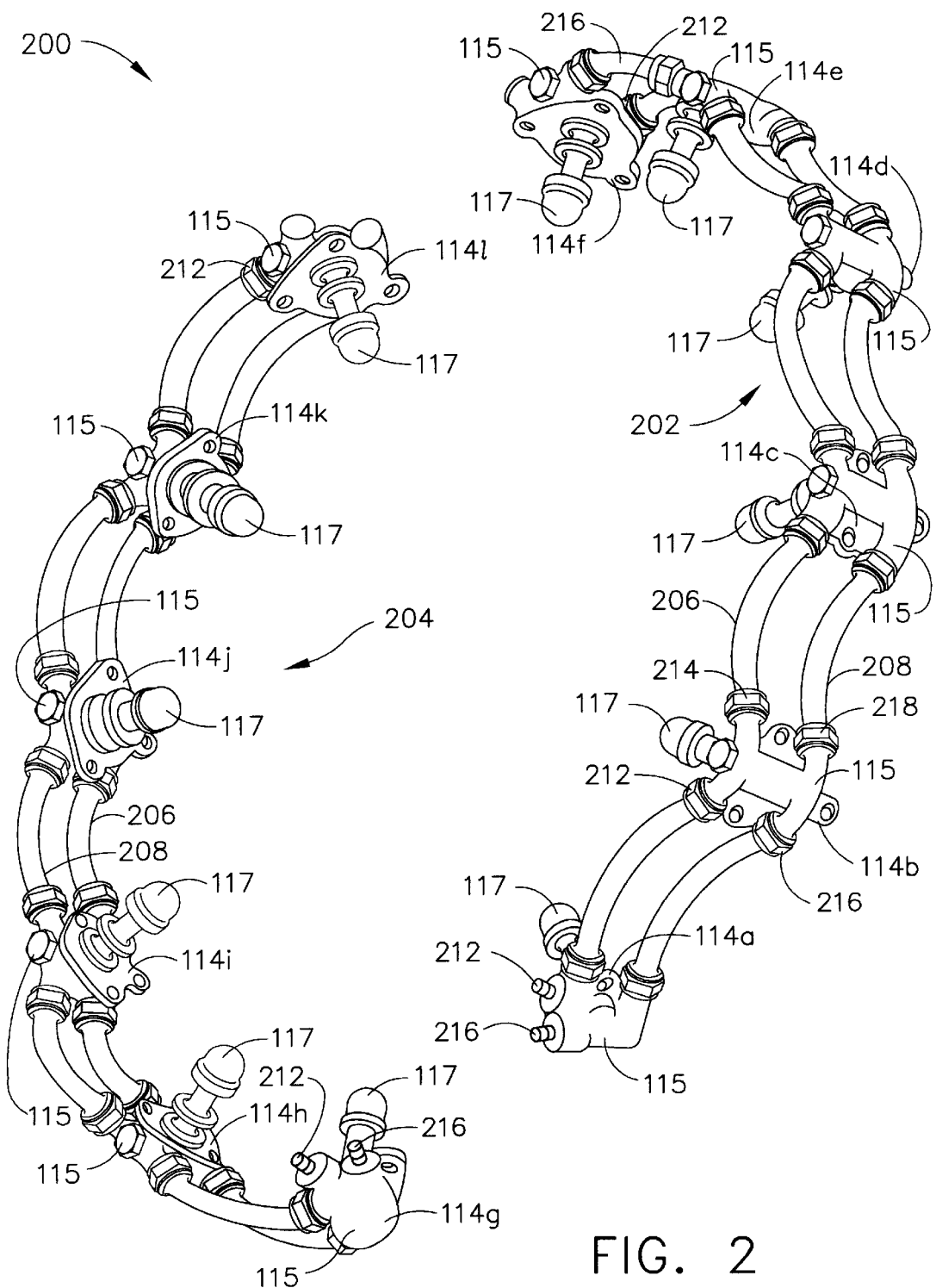
FIG. 2 is a perspective view of a jet engine fuel manifold that may be used in the turbofan jet engine depicted in FIG. 1.

As was previously noted, the fuel injector nozzles 114 that supply the fuel to the combustor section are coupled to a manifold that is located radially about the engine 100. An exemplary embodiment of one such fuel manifold 200 is illustrated in FIG. 2. The particular manifold assembly 200 depicted in FIG. 2 consists of a matched set of manifold sub-assemblies 202, 204, one for each side of the combustor 108. Each manifold assembly 202, 204 includes a plurality of flexible conduit sets, consisting of a primary conduit 206 and a secondary conduit 208, interconnecting the individual fuel injector nozzles 114a–l.

The fuel injector nozzles 114a–l are generally identical, in that each includes a body portion 115, and separate internal primary and secondary flow paths (not depicted) that direct fuel through a nozzle portion 117. However, as can be seen in FIG. 2, the fuel injector nozzles 114a–l are not all identical externally. More particularly, while each of the fuel injector nozzles 114a–e and 114g–k includes an inlet port 212 and an outlet 214 for primary fuel flow, and an inlet port 216 and an outlet port 218 for secondary fuel flow, end fuel injector nozzles 114f and 114l includes only a primary 212 and a secondary 216 inlet port, and no outlet ports. In addition, the other end fuel nozzles 114a and 114f are shaped differently from the remaining injector nozzles 141b–e and 114h–k, in that its primary 212 and secondary 216 inlet ports are positioned to conveniently couple the manifold sub-assemblies 202, 204 to the aircraft's fuel distribution system (not shown).

During normal operation of the engine 100, when both primary and secondary fuel flow (referred to as "combined flow") is used, fuel enters the end fuel nozzle 114a and 114g via their primary 212 and secondary 216 inlet ports. A portion of the fuel is ejected out the nozzle portion 117, and the remaining portion is directed out the primary 214 and secondary 218 outlet ports. The primary and secondary fuel flow is then coupled to the next nozzles 114b, h via the primary 206 and secondary 208 fluid conduits, respectively. The primary and secondary fuel flow through the remainder of the fuel nozzles 114b–e and 114h–k is identical until it reaches the end fuel nozzles 114f and 114g, which have no outlets other than their nozzle portion 117. Fuel flow through each of the manifold sub-assemblies 202, 204 is similar when only primary, or only secondary, fuel flow is used, except that fuel does not flow in and through the non-used portions of the manifold sub-assemblies 202, 204. In other words, if only primary fuel flow is being used, such as during engine start-up or idle operations, then fuel flows through only the primary flow path portions of the fuel nozzles 114a–l and manifold sub-assemblies 202, 204. Conversely, if only secondary fuel flow is being used, which is rare (if at all) during normal engine operations, then fuel flows through only the secondary flow path portions of fuel nozzles 114a–l and the manifold sub-assemblies 202, 204.

The fuel manifold assembly 200, as was previously noted, is periodically removed from the engine 100 and subject to flow distribution testing. This testing is accomplished by connecting the fuel manifold sub-assemblies 202, 204 to a testing machine, and determining the flow distribution through each of the fuel nozzles 114a–l. One such machine, which is the subject of the present invention, is depicted in FIGS. 3–11, and will now be discussed in detail.

Figure 3:
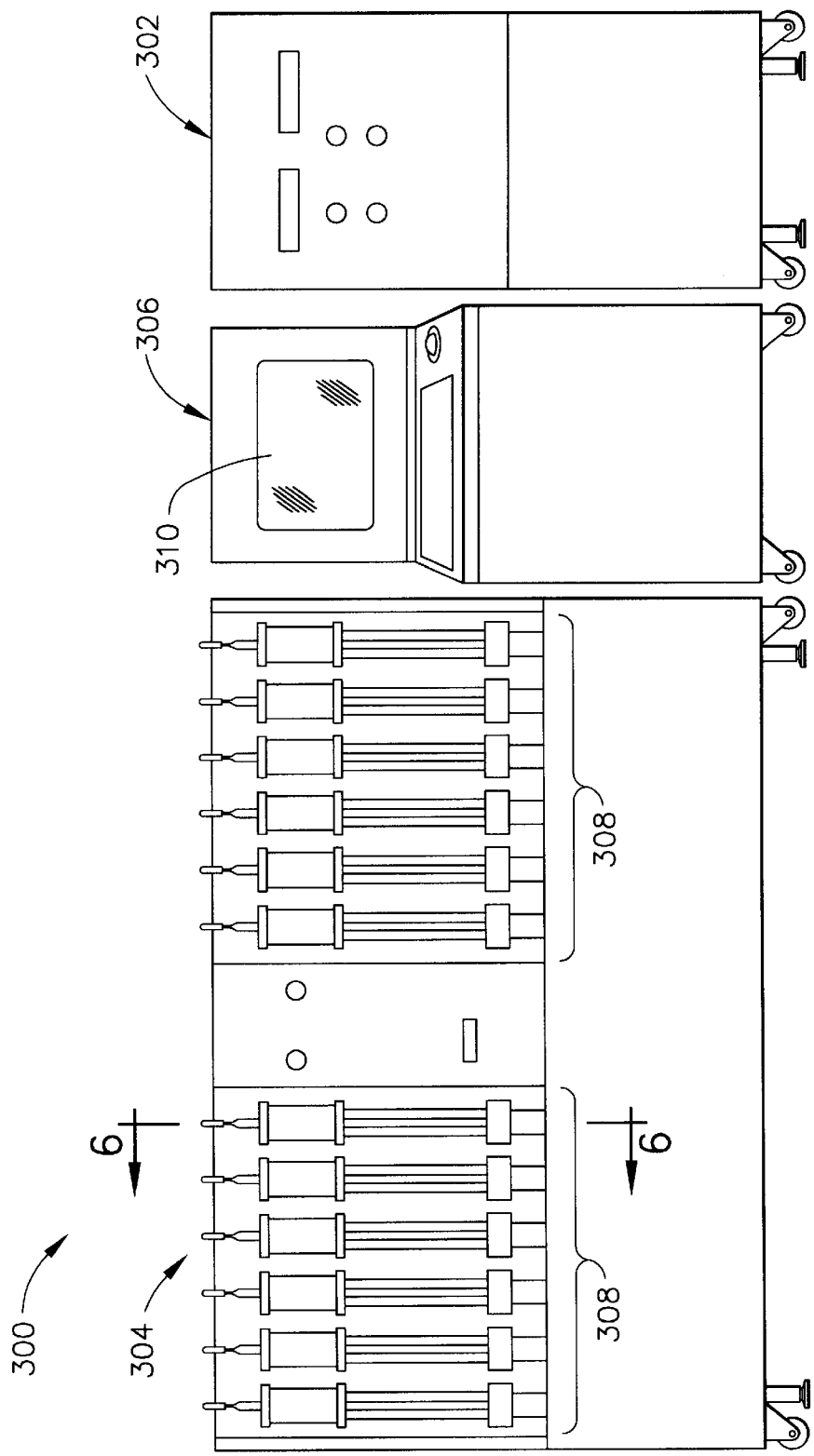
FIG. 3 is a front view of a machine for testing fuel manifold flow distribution according to an embodiment of the present invention.

Referring first to FIG. 3, a front view of a machine for testing fuel manifold flow distribution, according to a preferred embodiment, is depicted. The test machine 300 includes three main components, the test fluid supply unit 302, the flow test unit 304, and the control unit 306. In general, the test fluid supply unit 302 stores and supplies a test fluid to the flow test unit 304. The fuel manifold assembly 200 is coupled to the flow test unit 304, and the test fluid supplied from the fluid test supply unit 302 flows into and through the manifold assembly 200 and associated fuel nozzles 114a–l. The fluid ejected from each of the fuel nozzles 114a–l during the test is collected in one of a plurality of individual measurement vessels 308. The control unit 306 periodically samples data from level sensors that are coupled to each of the measurement vessels 308, and calculates and displays the flow rate through each fuel nozzle 114a–l throughout the test based on the sampled data. Each of these individual units is discussed in more detail below. It is to be appreciated that the test device 300 could be integrated into a single device, even though it is depicted and described below as three separate units.

Figure 4:
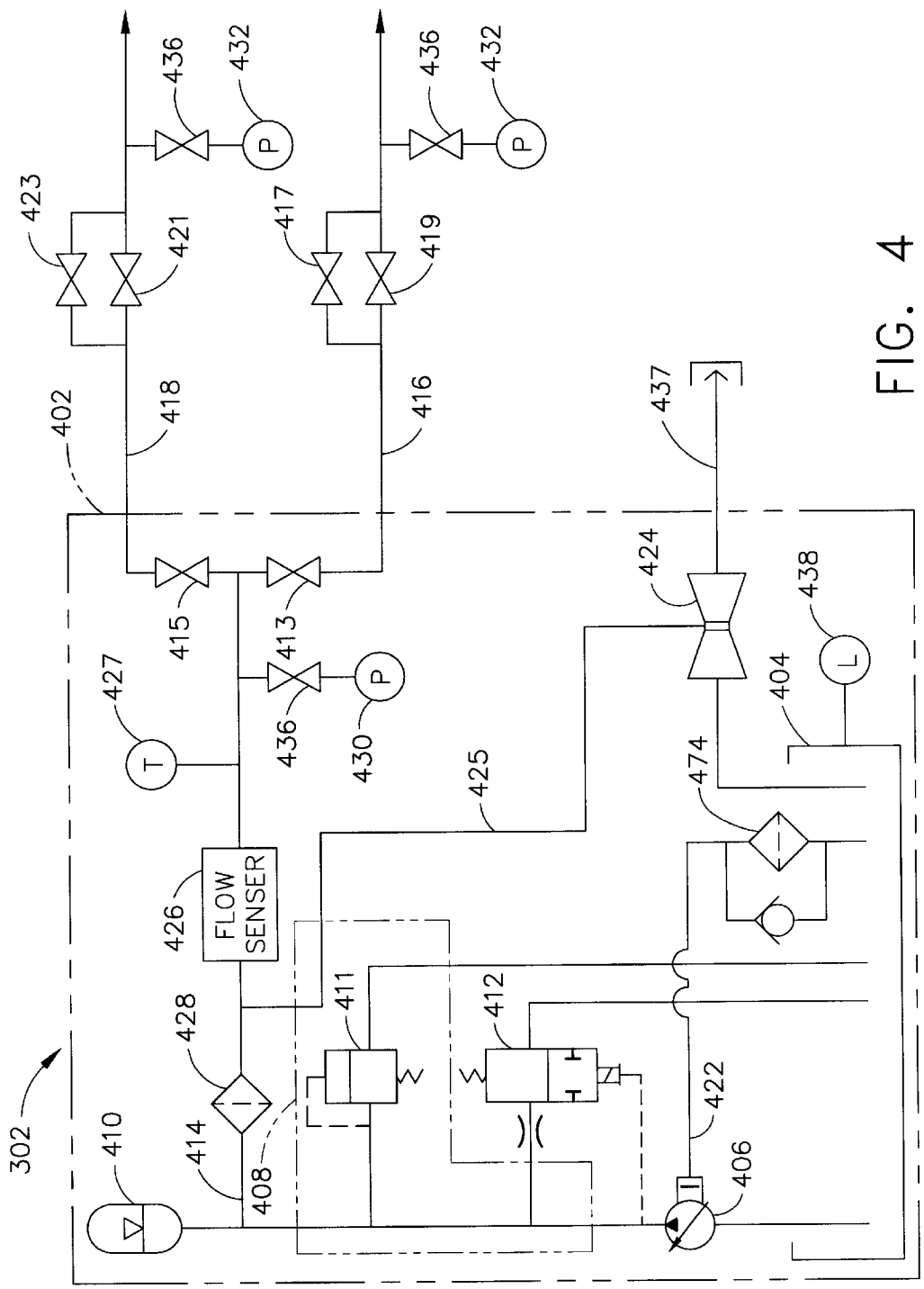
FIG. 4 is a schematic representation of a test fluid supply unit which forms a portion of the machine depicted in FIG. 3.

Turning now to FIG. 4, a more detailed discussion of a preferred embodiment of the test fluid supply unit 302 will be provided. As shown in schematic form in FIG. 4, the test fluid supply unit 302 houses, within an enclosure 402 (depicted in phantom), various components used to supply the flow test unit 304 with test fluid. The first of these various components to be discussed is a test fluid supply tank 404. The test fluid supply tank 404 stores the test fluid used during the test. Although the test fluid may be any one of numerous fluids, including jet fuel or water, for safety and testing accuracy, the test fluid used is Stoddard solvent MIL-PRF-7024 type II. This test fluid is preferable because its physical properties at room temperature, e.g. density, viscosity, etc., are similar to that of jet fuel at the temperature at which it operates in a turbofan engine. However, the test fluid has a much higher flash point than jet fuel for improved safety.

A pump 406 takes a suction from the test fluid supply tank 404 and discharges the test fluid to a fluid manifold assembly 408. Various components and piping systems are coupled in fluid communication with the manifold assembly 408. These components include an accumulator 410 that helps minimize fluid pressure oscillations within the remainder of the system piping. An accumulator dump valve 412 is coupled to the fluid manifold assembly 408 as well. The accumulator dump valve 412 relieves the pressure in the accumulator 410 and dumps the fluid back to the test fluid supply tank 404 when the test machine 300 is no longer being used. A safety pressure relief valve 411 is also coupled to the fluid manifold assembly 408, and is used to relieve fluid pressure in the fluid supply system piping back to the test fluid supply tank 404 should the fluid pressure exceed a predetermined pressure setpoint. Finally, a main test fluid supply line 414 is also coupled to the fluid manifold assembly 408. This main test fluid supply line 414 directs the test fluid discharged from the pump 406 to the remainder of the system.

A plurality of additional test fluid flow lines is coupled to the main test fluid supply line 414 via individual isolation valves. These additional flow lines include a primary supply line 416, a secondary supply line 418, and a jet-pump bleed line 425. As will be discussed in more detail further below, the primary supply line 416, which is coupled to the main test fluid supply line 414 by a primary line isolation valve 413, directs test fluid to the primary fluid conduits 206 of the manifold sub-assemblies 202, 204 under test. Similarly, the secondary supply line 418, which is coupled to the main test fluid supply line 414 by a secondary line isolation valve 415, directs test fluid to the secondary fluid conduits 208 of the manifold assembly 200 under test. The primary supply line 416 and secondary supply line 418 each include a coarse and a fine throttle valve coupled in parallel with one another. Specifically, the primary supply line 416 includes a coarse primary throttle valve 417 and a parallel-connected fine primary throttle valve 419. Similarly, the secondary supply line 418 includes a coarse secondary throttle valve 421 and a parallel-connected fine secondary throttle valve 423. The primary 417, 419 and secondary 421, 423 throttle valves are used to adjust the test fluid supply pressure magnitude in the primary supply line 416 and secondary supply line 418, respectively, during the test. It is to be appreciated that one or more of the primary 417, 419 and secondary 421, 423 throttle valves may be either electrically-operated or manually-operated valves. In a preferred embodiment, however, one or more of these valves 417, 419, 421, 423 are electrically-operated and are automatically positioned by control signals supplied from the control unit 306. A pump bypass flow line 422 returns pump bypass fluid to the test fluid supply tank 404, through a water cooled heat exchanger 424. It is to be further appreciated that the throttle valves may be physically located in either the test fluid supply unit 302 or in the flow test unit 304. For convenience the valves are depicted in FIG. 4 with the test fluid supply unit; however, in a preferred embodiment these valves are mounted in the flow test unit 304.

A flow sensor 426 is preferably coupled to the main test fluid supply line 414. The flow sensor 426 supplies an electrical signal representative of total test fluid flow being supplied by the pump 406, and may be any one of numerous flow sensors including, but not limited to, a turbine flow meter, a venturi flow sensor, a thermal flow sensor, or a Coriolis-type flow sensor. As will be discussed further below, the test fluid flow signal is periodically sampled by the test control unit 306 and used to display the total test fluid flow rate in the main test fluid supply line 414. A temperature sensor 427 is placed downstream of the flow sensor 426, and supplies an electrical signal representative of test fluid temperature for sample and display by the control unit 306. The temperature sensor 427 may any one of numerous temperature sensors known in the art including, but not limited to, a thermocouple or a resistance temperature detector (RTD). A filter 428 may also be included in the main test fluid supply line 414 to capture any debris that may get into the test fluid supply tank 404. A first 430, a second 432, and a third 434 pressure sensor are coupled to the main test fluid supply line 414, the primary supply line 416, and the secondary supply line 418, respectively, via individual isolation valves 436. These pressure sensors each supply electrical signals representative of the fluid pressure within the respective supply lines, and may be any one of numerous pressure sensors including, but not limited to, bellows sensors, semiconductor sensors, and quartz sensors. As with the test fluid flow signal, the pressure signals supplied by the first 430, second 432, and third 434 pressure sensors are periodically sampled by the test control unit 306 and used to display the test fluid pressures in the main 414, primary 416, and secondary 418 supply lines, respectively.

Finally, a return line 437 is in fluid communication with the test fluid supply tank 404 and, as will be discussed in more detail further below, returns the test fluid supplied to the flow test unit 304 back to the test fluid supply tank 404 aided by a jet-pump 424 driven by high pressure fluid in a bleed line 425 that taps into line 414 (upstream of the flow meter). A level sensor 438, which may be any one of numerous level sensors known in the art including, but not limited to, a float-type sensor, an optical sensor, or an ultrasonic sensor, supplies an electrical signal representative of at least a minimum test fluid level in the test fluid supply tank 404. As will be discussed further below, the output of the level sensor 438, and its concomitant circuitry, provides an indication on the control unit 306 that a minimum level of test fluid is in the test fluid supply tank 404.

Figure 5:
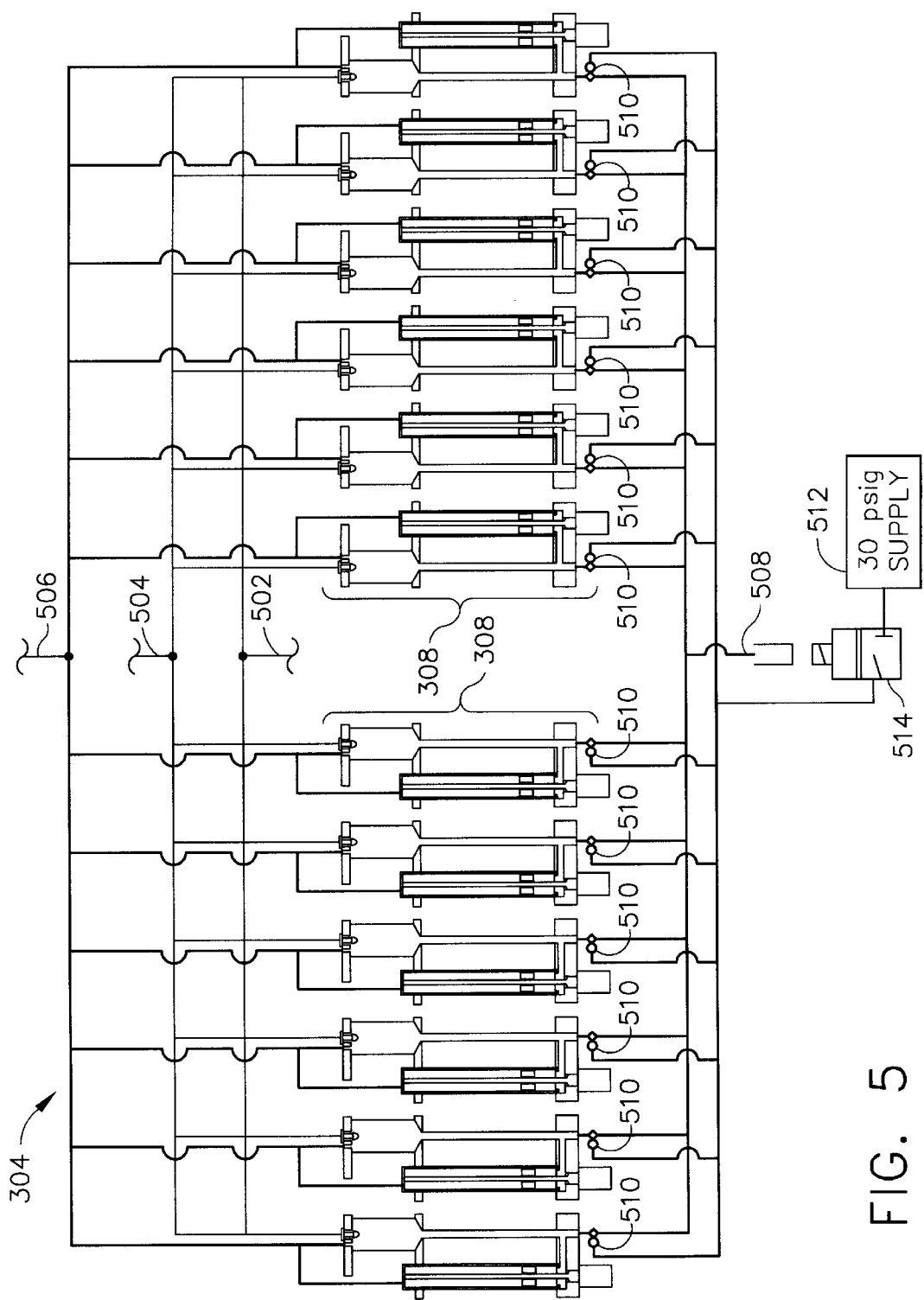
FIG. 5 is a schematic representation of a flow test unit which forms a portion of the machine depicted in FIG. 3.

With reference to FIG. 5, a discussion of the flow test unit 304 will now be provided. The flow test unit 304, which is depicted in simplified schematic form in FIG. 5, includes a primary supply line 502, a secondary supply line 504, a vent line 506, a return line 508, and the plurality of individual measurement vessels 308. The primary supply line 502 and the secondary supply line 504 are coupled in fluid communication with the primary supply line 416 and the secondary supply line 418, respectively, in the test fluid supply unit 302. Similarly, the return line 508 is coupled in fluid communication with the return line 437 in the test fluid supply unit 302. The vent line 506 is coupled to the tops of each of the individual measurement vessels 308 and vents them to atmospheric pressure so that there is no pressure build-up within the measurement vessels 308, which would adversely affect testing accuracy.

Figure 6:
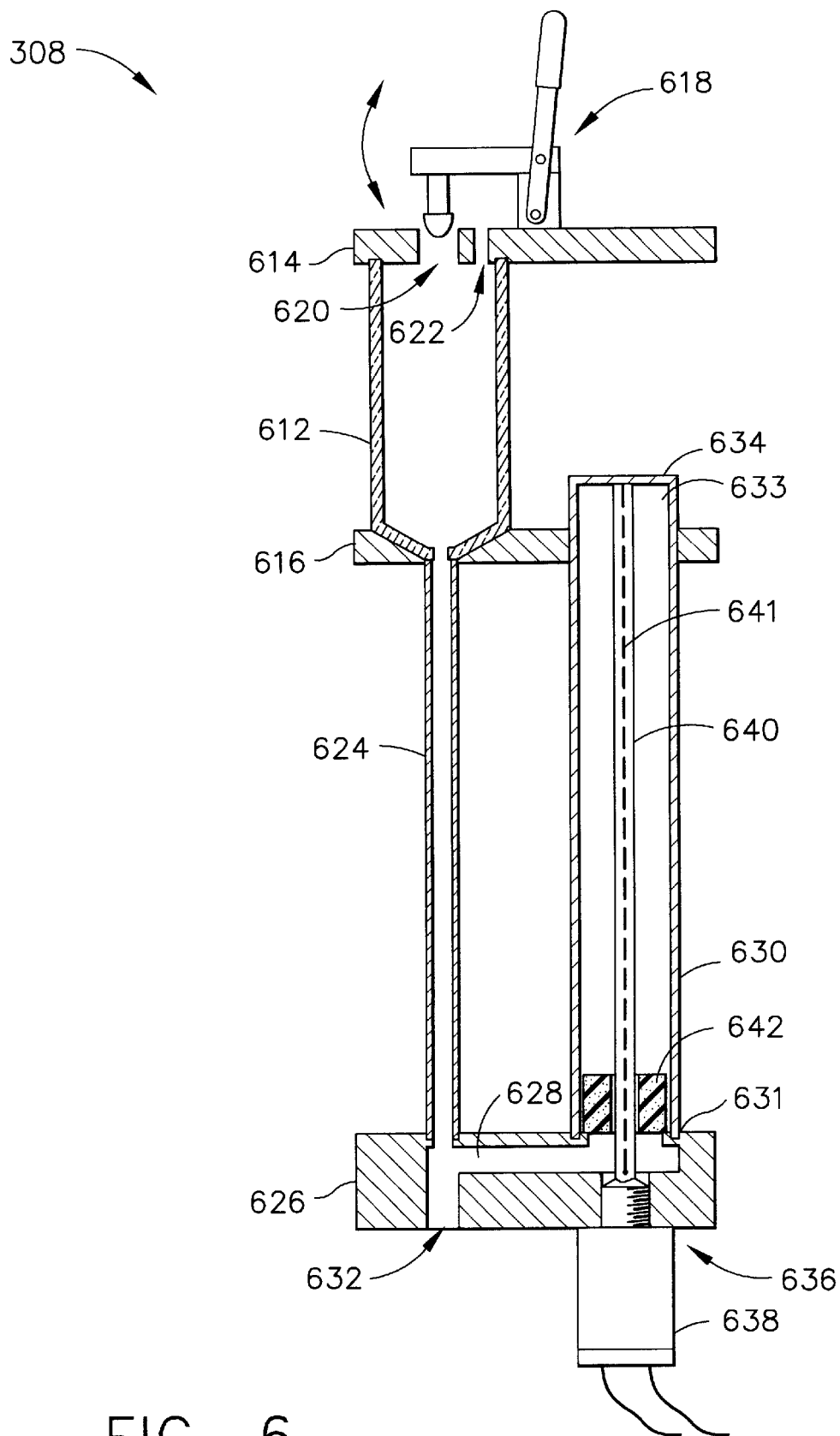
FIG. 6 depicts a cross section side view of a single measurement vessel taken along line 6—6 of FIG. 3.

Before proceeding with the description of the remainder of the flow test unit 304, a detailed description of an embodiment of one of the measurement vessels 308 will first be provided. In doing so, reference should be made to FIG. 6, which depicts a cross section side view of a single measurement vessel taken along line 6—6 of FIG. 3. For the sake of clarity, FIG. 6 does not depict any external components coupled to the illustrated measurement vessel 308, except for a level transducer. As FIG. 6 illustrates, the measurement vessels 308 comprise an assembly of various components, which includes a substantially transparent tube 612 coupled between a nozzle mounting plate 614 and a stabilizing mounting plate 616. The tube 612 is substantially transparent so that an operator can view the spray pattern of the test fluid emitted from the nozzle portion 117 of each of the installed fuel injector nozzle 114*a–l*. The nozzle mounting plate 614 includes a nozzle assembly mounting clamp 618, and at least two openings. A first opening 620 is configured to receive the nozzle portion 117 of one of the fuel injector nozzles 114*a–l*, and a second opening 622 is an air vent. When a manifold sub-assembly 202, 204 is being tested, the manifold's fuel injector nozzles 114*a–l* are mounted on top of the nozzle mounting plate 614, such that the nozzle portions 117 extend through the first opening 620. The nozzle assembly clamp 618 is then used to firmly hold the fuel injector nozzle 114*a–l* in place throughout the test. Though not depicted, the second opening 622 is coupled to the vent line 506. The stabilizing mounting plate 616 stabilizes the tube 612 and the other components of the measurement vessel 308, which will now be discussed in more detail.

A fluid communication tube 624 is coupled between a manifold block 626 and the stabilizing mounting plate 616. The fluid communication tube 624 receives the test fluid ejected into the tube 612 from the nozzle portion 117 of the installed fuel injector nozzle 114*a–l*, and communicates it to a fluid distribution path 628 within the manifold block 626. The fluid distribution path 628 provides fluid communication between the fluid communication tube 614 and a measuring tube 630. The manifold block 626 also includes a drain opening 632 in fluid communication with the fluid distribution path 628. As will be discussed further below, the drain opening 632 is coupled, via a valve, to the return line 508.

Similar to the fluid communication tube 624, the fluid measuring tube 630 is coupled between the manifold block 626 and the stabilizing mounting plate 616. An opening 634 is provided in an end portion of the fluid measuring tube 630, to vent air displaced by the test fluid that enters the fluid measuring tube 630. Thus, when test fluid is sprayed from the installed fuel injector nozzle 114*a–l* into the transparent tube 612, the test fluid drains into the fluid communication tube 624. The test fluid in the fluid communication tube 624 then flows into and through the fluid distribution path 628 in the manifold block 626. Since the fluid measuring tube 630 is in fluid communication with the fluid communication tube 624, fluid level in the fluid measuring tube 630 will rise concomitant with the fluid level in the fluid communication tube 624.

A fluid level sensor 636 is mounted to the manifold block 626 and is used to generate electrical signals representative of test fluid level in the fluid measuring tube 630. The fluid level sensor 636 includes a transceiver 638 coupled to a tube 640 that extends longitudinally within the fluid measuring tube 630, from a bottom portion 631 to a top portion 633 of the measuring tube 630. The skilled artisan will appreciate that the tube 640 need not extend all the way to the top portion 633 of the measuring tube 630. Nonetheless, to provide the tube 640 with lateral stability, it is so configured in the depicted embodiment. A magnetic float 642 surrounds the tube 640 and is free to move along the longitudinal axis of the tube 640, and is buoyant in the test fluid. Thus, as fluid level rises in the fluid measuring tube 630, the magnetic float will concomitantly rise. It is to be appreciated that the magnetic float 642 may be an integral piece that is itself magnetized, or may be comprised of separate pieces that provide a magnetic field.

The fluid level sensor 636 operates on the principle of time-domain-reflectometry (TDR). Under this principle, the transceiver 638 periodically transmits electrical pulses into a conductor 641 (shown in phantom) mounted longitudinally within the tube 640. Each of the electrical pulses traverses the conductor 641 until it reaches the magnetic float 642. Upon attaining the same position as the magnetic float 642, the electrical pulse is reflected back toward the transceiver 638, due to the pulse's interaction with the magnetic field emitted by the magnetic float 642. The transceiver 638 receives the reflected pulse and determines the distance to the magnetic float 642 based on the time it took for the transmitted electrical pulse to be reflected back to the transceiver 638. An example of one such level sensor is sold by BALLUFF, Inc.®, having a Part No. BTL2-P1-0400-Z-EEXA-KL.

It is to be appreciated that the fluid level sensor 636 is not limited to the embodiment depicted in FIG. 6 and described above. Rather, this level sensor is only exemplary of a preferred embodiment due to its accuracy and sensitivity. Other types of level sensors known in the art including, but not limited to, resistive sensors and optical sensors, may also be used. It is to be further appreciated that the measurement vessels 308 are not limited to the particular depicted configuration. Indeed, the measurement vessels 308 could be configured as single tubes, rather than as an assembly of various components.

Returning once again to FIG. 5, the discussion of the flow test unit 304 will now be completed. It was previously mentioned that each of the manifold blocks 626 that form a part of the preferred measurement vessels 308 include a drain opening 632 coupled in fluid communication, via valves 510, with the return line 508. Although these valves 510 may be any one of numerous valves known in the art, such as manual valves, solenoid operated valves, or hydraulically operated valves, in the depicted embodiment the valves 510 are air operated valves. In a particular preferred embodiment, the valves 510 are so-called "pinch valves," sold by Red Valve Company, Inc.®, under part number 2600-3/4 BUNA N.

To accommodate the preferred drain valve embodiment discussed immediately above, an air supply line 512 is provided to operate each of the valves 510. A solenoid operated, valve 514 is coupled in the air supply line 512 between each of the valves 510 and a non-illustrated source of 30 psig air. The test control unit 306 controls the position of the valve 514. When the solenoid is energized, the valve 514 supplies 30 psig air to each of the valves 510 causing each to close,. Conversely, when the solenoid is de-energized, the valve 514 vents the valves 510 to atmosphere, thus opening them, and causing the measurement vessels 308 to drain the collected test fluid back to the test fluid supply tank 404

Figure 7:
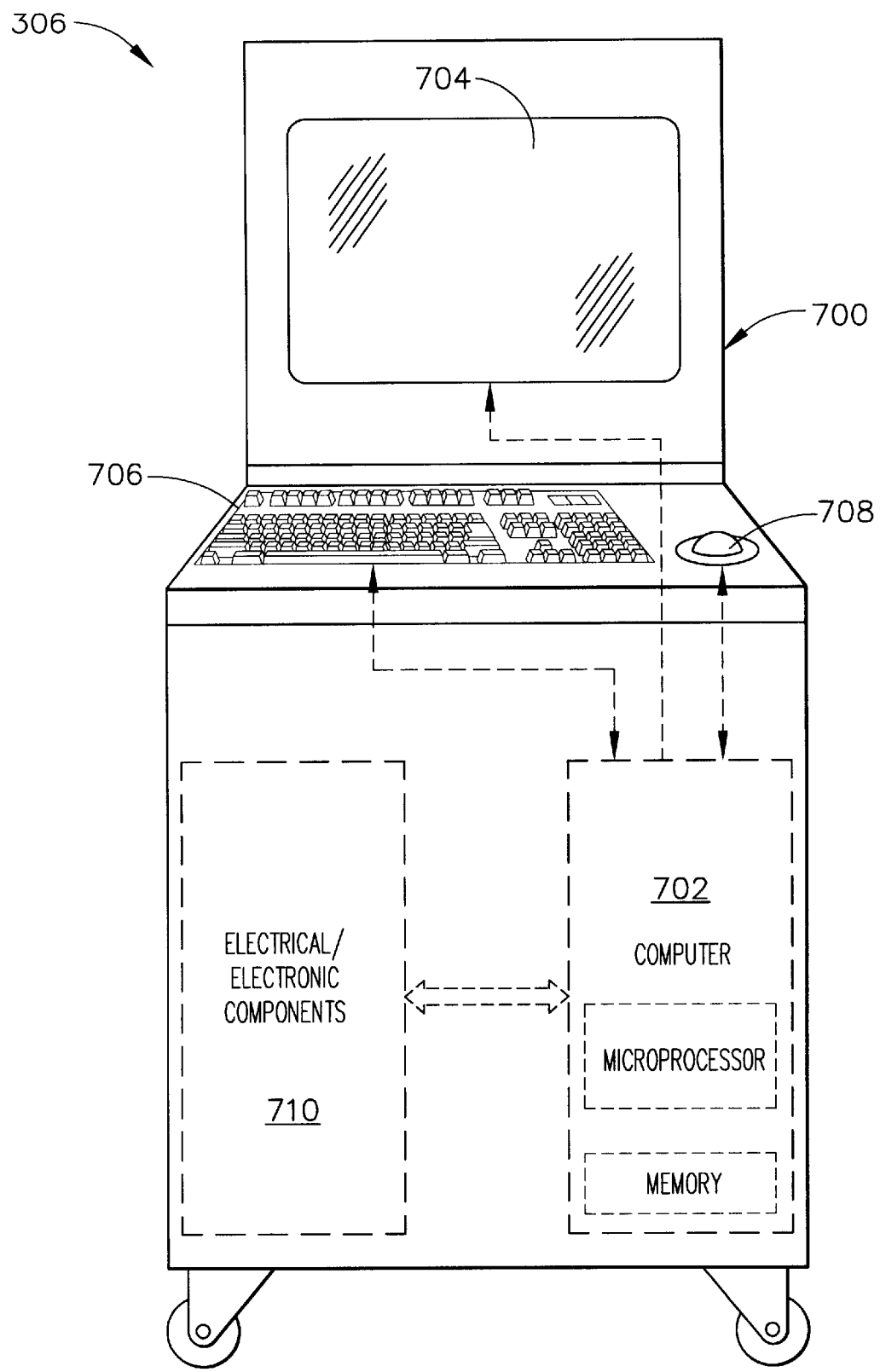
FIG. 7 depicts a front view of a control unit which forms a portion of the machine depicted in FIG. 3.

The control unit 306 is coupled to the various instrumentation and control devices described above and, with reference to FIGS. 7–10, will now be discussed in detail. Turning first to FIG. 7, the overall arrangement of the control unit 306 will first be described. The control unit 306 houses within an enclosure 700 various devices that are used to monitor and control the overall operation of the test machine 300. These devices include a computer 702 (shown in phantom), which may be any one of numerous general-purpose computers, such as a personal computer (PC), or a specially designed computational device. A display device 704 is coupled to the computer 702 and displays a test-related user interface, which is discussed in more detail below. A printer, though not explicitly depicted, is also coupled to the computer 702 and is used to print out test results. Two input devices are also coupled to the computer 702. These input devices include a keyboard 706 and a "mouse" 708. It will be appreciated that both of the input devices 706, 708 are not necessary, and that the control unit 306 would be operable if only the keyboard 706 were used. The keyboard 706 allows an operator to input certain alpha-numeric data into the computer 702 and, if necessary, to manipulate a screen cursor to control operation of the computer 702 should the mouse 708 not be installed or be inoperative. The mouse 708 is used to conveniently position the screen cursor to desired positions on the screen of the display 704 to more easily accommodate computer operations. Finally, various electrical and electronic components 710 are also housed within the control unit enclosure 700. These electrical and electronic components 710 provide an interface between the previously described instrumentation and control devices and the computer 702, and will now be discussed in more detail.

The various instrumentation and control devices, it will be recalled, include the flow sensor 426, first 430, second 432, and third 434 pressure sensors, the fluid supply tank level sensor 438, the temperature sensor 427, the level sensors 636, the pump 406, the accumulator dump valve 412, the electrically-operated primary 417 and secondary 419 throttle valves, and the valve 514. It will be appreciated that the flow sensor 426, first 430, second 432, and third 434 pressure sensors, the temperature sensor 438, and the level sensors 636 are each coupled to the computer 702 using substantially identical circuitry. Hence, for the sake of brevity, the circuitry associated with only one of these sensors will be depicted and described in detail. In doing so, attention should now be turned to FIG. 8, which depicts a block diagram of the circuitry 800 associated with each of the level sensors 636.

The level sensor 636 is coupled, via a plurality of safety barriers 802, to an instrumentation interface circuit 804 and a power supply 806. The safety barriers 802 are known protection devices that operate on the zener diode principle. That is, the devices limit the voltage potential across, and thus the current flow through, the device to which each is coupled. Thus, the likelihood of any potentially unsafe condition that could be caused by an over-voltage or over-current condition to the connected device is substantially reduced. The instrumentation interface circuit 804 receives operational power from the power supply 806 and converts the signal from the level sensor 636 to an appropriate input to the computer, which may be either an analog current level (e.g., 4–20 milliamperes) or a digital value. The power supply 806 also supplies operational power to the level sensor 636. It is noted that the power supply 806 may supply power to more than one sensor.

The instrumentation interface circuit 804 is coupled to an input/output (I/O) circuit 808, which in turn is coupled to a microprocessor 810 within the computer 702. The I/O circuit 808 may be an individual I/O circuit dedicated to a single level sensor 636, or a multi-channel I/O circuit shared by several sensors. The microprocessor 810 is controlled by software located in a memory 812. The memory 812 may either be integral to the microprocessor 810 or, as depicted, physically separate. The software, among other things, controls the microprocessor 810 to periodically sample the signals transmitted from the level sensor 636 to, and through, the instrumentation interface circuit 804 and I/O circuit 808. The sampling frequency may be any one of numerous sampling frequencies, but in a preferred embodiment the sampling frequency is at least five times per second.

Figure 8:
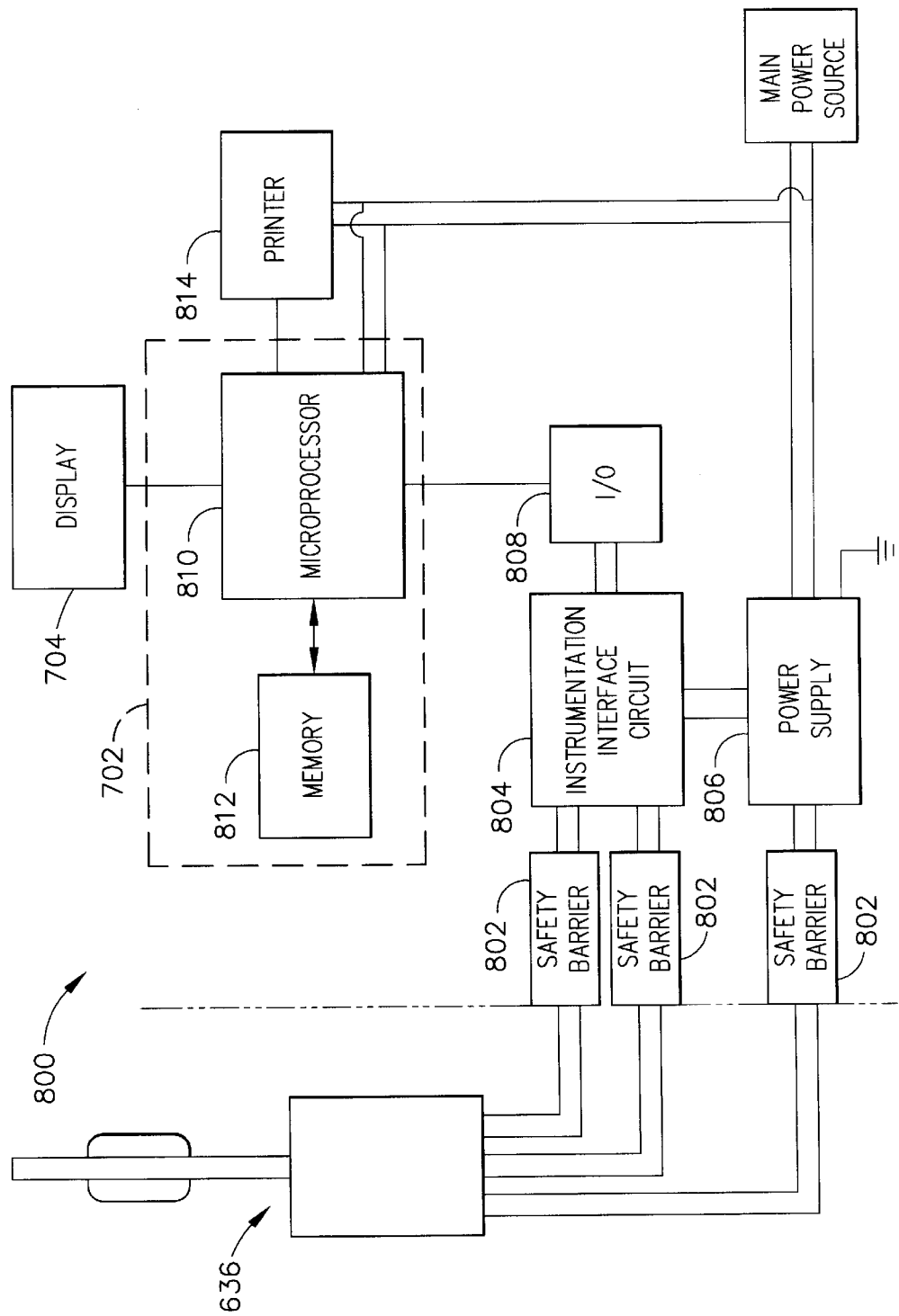
FIG. 8 depicts a block diagram of the circuitry associated with each of the various sensors used in the machine depicted in FIG. 3.
Figure 9:
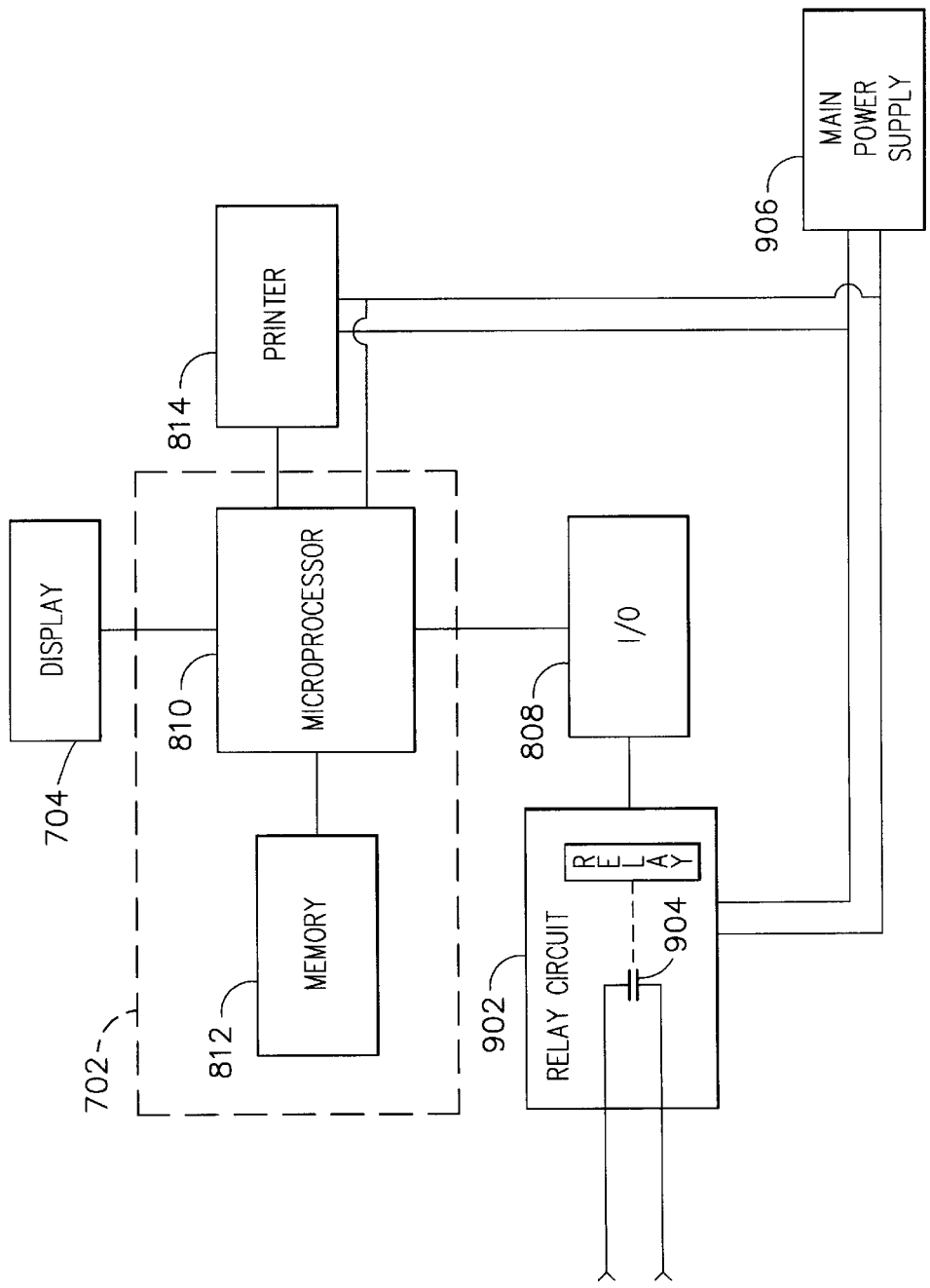
FIG. 9 depicts a block diagram of the circuitry associated with each of the various pumps and control valves used in the machine depicted in FIG. 3.
Figure 10:
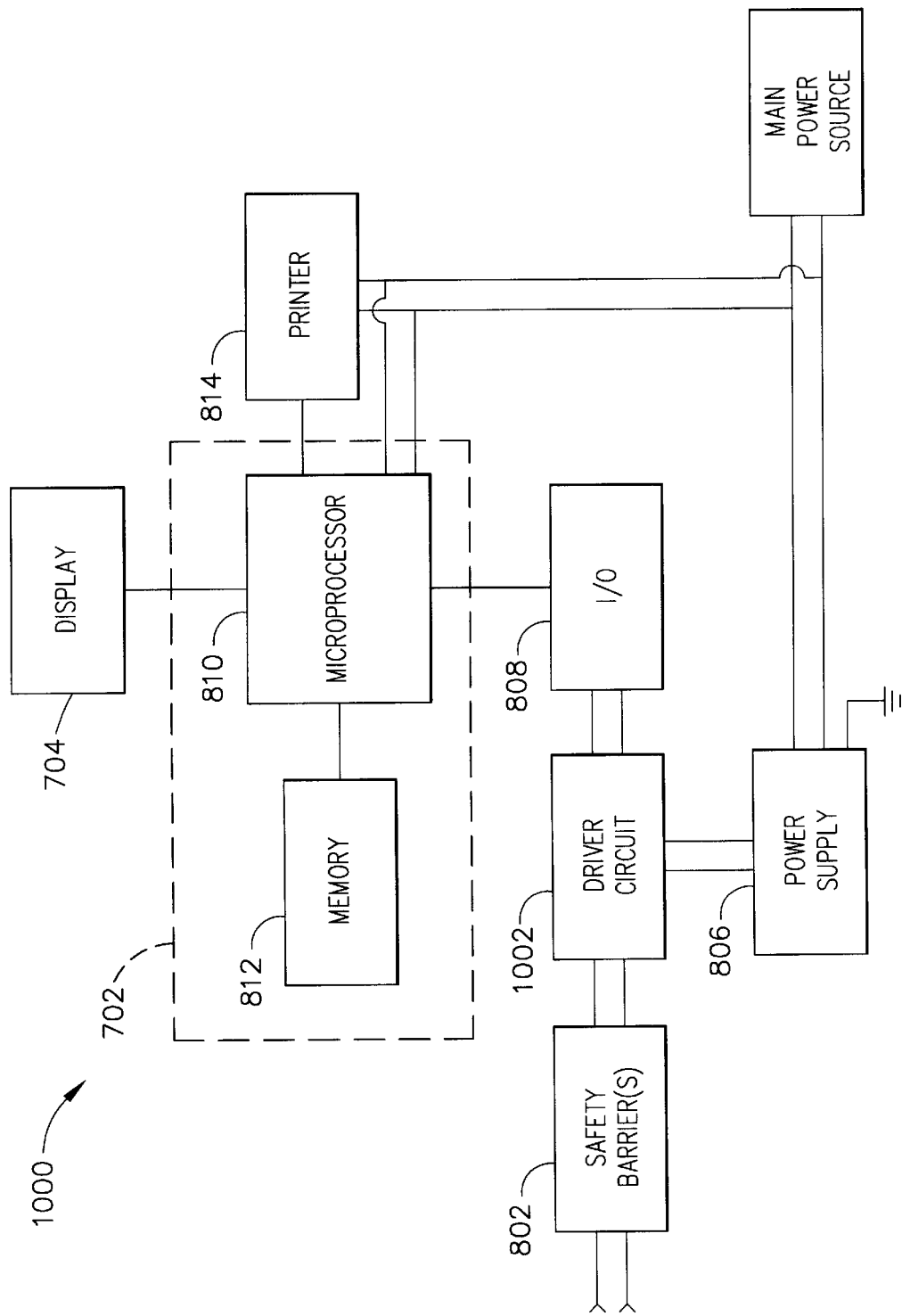
FIG. 10 depicts a block diagram of the circuitry associated with various remotely controlled throttle valves used in the machine depicted in FIG. 3.

The circuitry used to process the control signal to the pump 406, the electrically-operated primary 417 and secondary 419 throttle valves, and the valve 514, and which is depicted in FIGS. 9 and 10, is similar to that described immediately above. However, as FIG. 9 depicts, the circuitry 900 associated with the pump 406,, and the valve 514, includes a relay circuit 902, rather than an instrumentation interface circuit 804, and does not include the safety barriers 802, since all of the leads associated with this circuitry remain within explosion-proof cases. The relay circuit 902 is used to control the position of one or more relay contacts 904, which in turn selectively controls the supply of power from a power supply 906 to the device being controlled. The power supply 906 depicted in FIG. 9 may be a low voltage power supply similar to that depicted in FIG. 8, or may be the main power supply to the test machine 300.

The circuitry 1000 associated with each of the electrically-operated primary 417 and secondary 419 throttle valves, one of which is depicted in FIG. 10, differs from that of FIG. 8 in that it includes a driver circuit 1002 rather than an instrumentation interface circuit 804. The driver circuit 1002, under control of the microprocessor 810, supplies power to the electrically-operated throttle valve 417 (419) to maintain an appropriate test fluid pressure magnitude in the primary (or secondary) supply line 416 (418), as sensed by the first (second) pressure sensor 432 (434).

Figure 11:
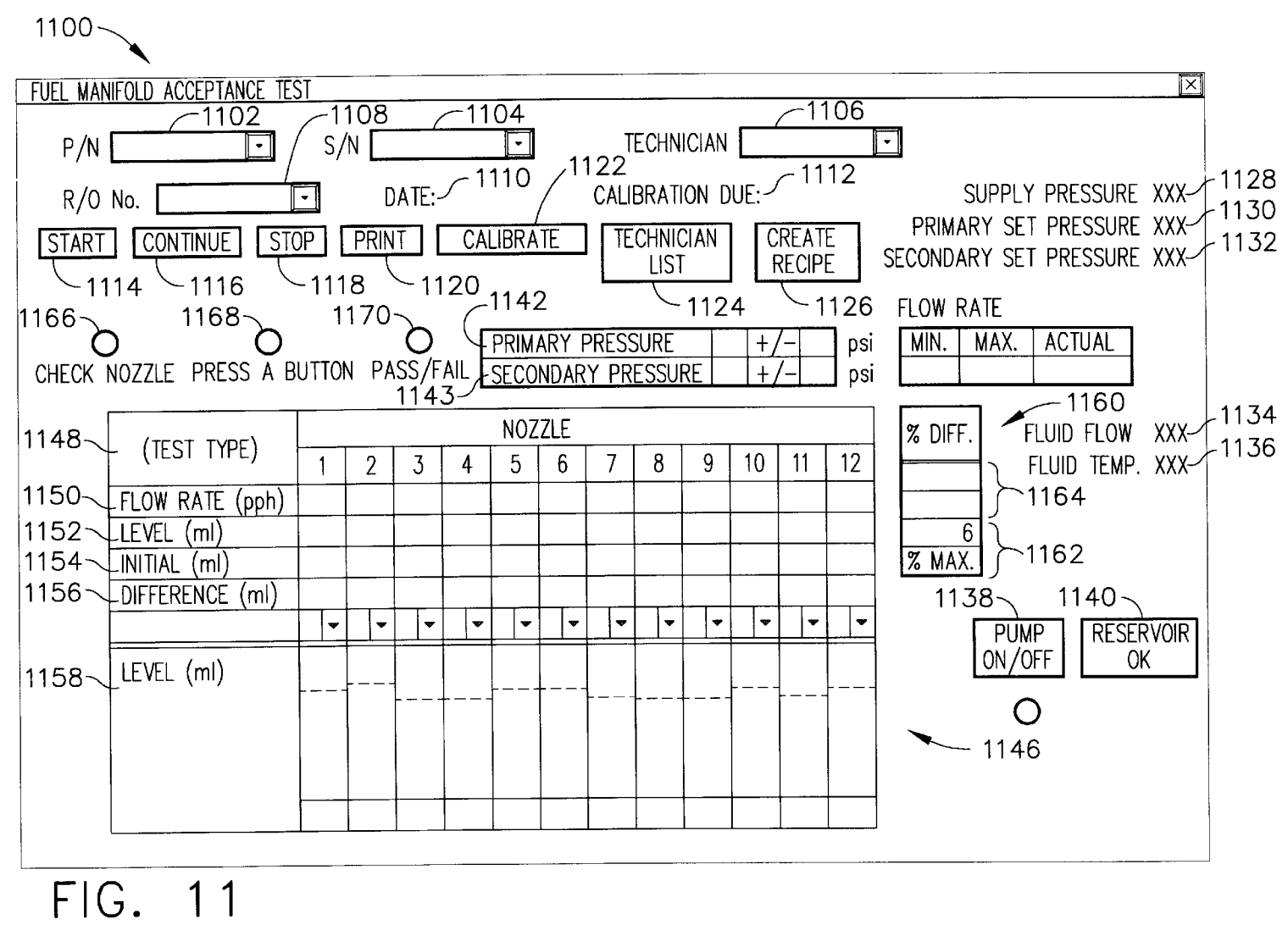

As was noted above, the display device 704 is coupled to the computer 702 and displays information processed within the computer 702. In addition, a printer 818 is preferably coupled to the computer 702 and is used to print out test data processed within the computer 702. With reference now to FIG. 11, the various types of information displayed and printed by the display device 704 and printer will be discussed. It will be appreciated that the fuel manifold test application software run by the computer 702 is started by, for example, double clicking on an icon on a start-up screen (not illustrated). When this is done, the user interface screen display 1100 illustrated in FIG. 11 is visible on the display device 704.

The user interface screen display 1100 includes various display fields, some of which are modifiable by an operator via the keyboard 706 and/or mouse 708, and others of which provide for only the display of data. Specifically, the user interface screen display 1100 includes a P/N field 1102, a S/N field 1104, a Technician field 1106, and an R/O No. field 1108. The P/N field 1102 allows an operator to enter the specific part number of the manifold assemblies being tested. The S/N field 1104 allows an operator to enter the specific serial number of the manifold assemblies being tested. The Technician field 1106 allows an operator to enter his/her name, and the R/O No. field 1108 allows an operator to enter the Repair Order number (for accounting/tracking purposes). Below these interactive fields are a Date display field 1110 and a Calibration Due display field 1112. The Date display field 910 displays the current date, and the Calibration Due display field 1112 displays the date that the next calibration is due for the test machine 300.

Seven so-called "button bars" are displayed below the above-mentioned fields. These seven button bars include a START button 1114, a CONTINUE button 1116, a STOP button 1118, a PRINT button 1120, a CALIBRATE button 1122, a TECHNICIAN LIST button 1124, and a CREATE RECIPE button 1126. As will be described more fully below, operating the START button 1114 causes the computer 702 to commence a test sequence, operating the CONTINUE button 1116 causes the computer 702 to continue on to another test in the test sequence, and operating the STOP button 1118 causes the computer 702 to discontinue a test or test sequence. Operating the PRINT button 1120, as it connotes, causes the computer 702 to deliver test result data to the printer 814 for printing. Operating the CALIBRATE button 1122 causes the computer 702 to run a password protected calibration procedure, which steps the operator through the calibration process for the test machine 300. The TECHNICIAN LIST button 1124, when operated, causes the computer 702 to run a password protected dialog procedure which allows the operator to edit a database that stores the names of technicians that are authorized to run the test machine 300. In order to run a test with the test machine 300, the name entered in the Technician field 1106 must match a name in the authorized user database. Finally, operating the CREATE RECIPE button 1126 causes the computer 702 to run a password protected dialog procedure which allows the operator to edit existing, or create new, "test recipes" stored in a test recipe database in memory 812. The test recipe database is a part of the fuel manifold test application software and includes all of the required pressure setpoints and flow tolerances that must be met during each of the tests. The test recipe database includes an entry associated with every valid part number that is entered by the operator. Thus, when the part number is entered in the P/N field 1102, the software automatically retrieves the appropriate test recipe from the database. If there are no entries in the recipe database that are associated with the entered part number, then a message is displayed on the user interface display screen 900.

A Supply Pressure field 1128 displays, in psig (pounds-per-square-inch gauge) the pressure sensed by the first pressure sensor 426. A Primary Set Pressure 1130 field displays the pressure sensed in the primary line 416 in psig by the second pressure sensor 432, and a Secondary Set Pressure field 1132 displays the pressure sensed in the secondary supply line 418 in psig by the third 434 pressure sensorA Fluid Flow field 1134 displays the fluid flow sensed by the flow sensor 426 in pph (pounds-per-hour). And, a Fluid Temp field 1136 displays the fluid temperature sensed by the temperature sensor 427 in degrees Fahrenheit.

Positioned below the above-described pressure, flow, and temperature display fields are a Pump On/Off button 1138 and a Reservoir OK field 1140. The Pump On/Off button 1138, when operated, turns the pump 406 in the test fluid supply unit 302 on and off. The Reservoir OK field 1140 indicates that the fluid level in the test fluid supply tank 404 is above a minimum required level, as sensed by level sensor 438. Additionally, positioned below the PRINT button 1120 and CALIBRATE button 1122 are a Primary Pressure field 1142 and a Secondary Pressure field 1144 which display the target pressures. These values are provided by the test recipe that is associated with the part number entered in the P.N field 1102. The largest field in the user interface screen display 1100 is the nozzle test data field 1146. Included in this field are a Test-Type field 1148, a nozzle Flow Rate field 1150, a numeric Level field 1152, an Initial field 1154, a Difference field 1156, and a graphic Level field 1158. The Test-Type field 1148 displays the type of flow test that is being (or will be) conducted. Thus, as will become more apparent further below, the Test-Type field 1148 will display either "Primary," "Secondary," or "Combined," to indicate that a primary flow test, a secondary flow test, or a combined flow test, respectively, is being conducted. Each of the remaining fields in the nozzle test data field 1146 provides a separate data display for each of the measurement vessels 308 and individual nozzles 114a–l in the manifold assembly 200 being tested. Hence, the nozzle test data field 1146 includes one column for each measurement vessel 308 and fuel nozzle 114a–l in the manifold sub-assemblies 202, 204. In a preferred embodiment, in which the manifolds consist of twelve nozzles, there are twelve columns in the nozzle test data field. Thus, the nozzle Flow Rate field 1150 displays the flowrate (in pph) through each of the nozzles 114a–l. The numeric Level field 1152 displays the current test fluid volume (in mL) in each of the measurement vessels 308. The Initial field 1154 displays the initial test fluid volume (in mL) in each of the measurement vessels 308 at the start of a particular flow test. The Difference field 1156 displays the difference between the current test fluid volume and the initial test fluid volume (in mL). And, the graphic Level field 1158 graphically displays the current test fluid volume (in mL) in each of the measurement vessels 308.

A test result field 1160 is provided on the user interface display screen display 1100. The test result field 1160 includes a tolerance field 1162 that displays the maximum acceptable percentage difference in flow rates through each of the nozzles being tested (%$\text{Diff}_{max}$) that comes from the recipe. Above this field is a result field 1164 that displays the calculated maximum percentage difference between nozzle flow rates based on the data gathered during the particular flow test. In particular, the software preferably calculates the maximum percentage difference between nozzle flow rates (%$\text{Diff}_{calc}$) by subtracting the lowest calculated individual nozzle flow rate from the highest calculated individual nozzle flow rate, and dividing the difference by the calculated median flow rate through all of the individual nozzles. It is to be appreciated that this calculation is only exemplary of a preferred method and that other methods of determining %$\text{Diff}_{calc}$ could be employed.

Finally, there are three indicators positioned between the nozzle test data field 1146 and the START button 1114, CONTINUE button 1116, and STOP button 1118. These indicators are a Check Nozzle indicator 1166, a Press a Button indicator 1168, and a PASS/FAIL indicator 1170. The Check Nozzle indicator 1166 prompts the operator to visually check the spray pattern of each nozzle. The Press a Button indicator 1168 alerts the operator that the software has completed the current test and is waiting for the operator to select the next step. The PASS/FAIL indicator 1170 illuminates with the appropriate message, either PASS or FAIL, upon completion of each test in the test sequence.

The test machine 300 is used to conduct three separate tests on the fuel manifold assembly 200. As was briefly mentioned above, these tests include a primary flow test, a secondary flow test, and a combined flow test. During the primary flow test, test fluid is directed to only the primary 212 inlet ports of each manifold sub-assembly 202, 204. During the secondary flow test, test fluid is directed to only the secondary 216 inlet ports of each manifold assembly 202, 204. And finally, test fuel flow is simultaneously directed to both the primary 212 and secondary 216 inlet ports during the combined flow test. It is noted that these tests are preferably conducted in the described order (e.g., primary, secondary, combined), but that the present invention is not limited to this order.

Briefly, the fuel manifold assembly 200 is tested by installing each sub-assembly 202, 204 in the flow test unit 304, such that the nozzles 114a–l extend through the first openings 620 in each of the measurement vessels 308. This is accomplished by mounting the manifold sub-assemblies 202, 204 and nozzles 114a–l on top of each of the nozzle mounting plates 614, and positioning each of the nozzle assembly stabilizers 618 to firmly hold the injector nozzles 114a–l in place. The primary 502 and secondary 504 supply lines are then coupled to the primary 212 and secondary 216 inlet ports of the end fuel nozzles 114a. Then, with the fuel manifold test application software running, the operator enters the appropriate data, starts the pump 406, and presses the START button 1114 to initiate the primary flow test. When the primary flow test is completed, the computer 702 calculates and displays the maximum percentage difference (%$\text{Diff}_{calc}$) between nozzle flow rates, and provides the appropriate message in the PASS/FAIL indicator 1170. The operator then presses the CONTINUE button 1116 to initiate the secondary flow test. After the secondary flow test is complete, the computer 702 once again calculates and displays the maximum percentage difference (%$\text{Diff}_{calc}$) between nozzle flow rates, and provides the appropriate message in the PASS/FAIL indicator 1170. Thereafter, the operator once again presses the CONTINUE button 1116 to initiate the combined flow test. And once again, upon completion of the test the computer 702 calculates and displays the maximum percentage difference (%$\text{Diff}_{calc}$) between nozzle flow rates, and provides the appropriate message in the PASS/FAIL indicator 1170. It is noted that during each of the primary, secondary, and combined flow tests, the operator observes the spray pattern of the test fluid emitted from each of the nozzles 114a–l. This is possible because of the measurement vessels' substantially transparent tube 612. It is additionally noted that upon completion of the combined flow test, the test data can be printed out by pressing the PRINT button 1120, and the test machine 300 is ready to begin another test cycle.

Having described the test machine 300 hardware in detail, and having very generally described how the software components control the test machine 300 to carry out the primary, secondary, and combined flow tests, a more detailed description of the flow test methodology carried out by the software loaded onto computer 702 will be provided. In this regard, the parenthetical references to "STEPs" in the following discussion correspond to the particular reference numerals of the process flowchart depicted in FIG. 12.

Figure 12A:
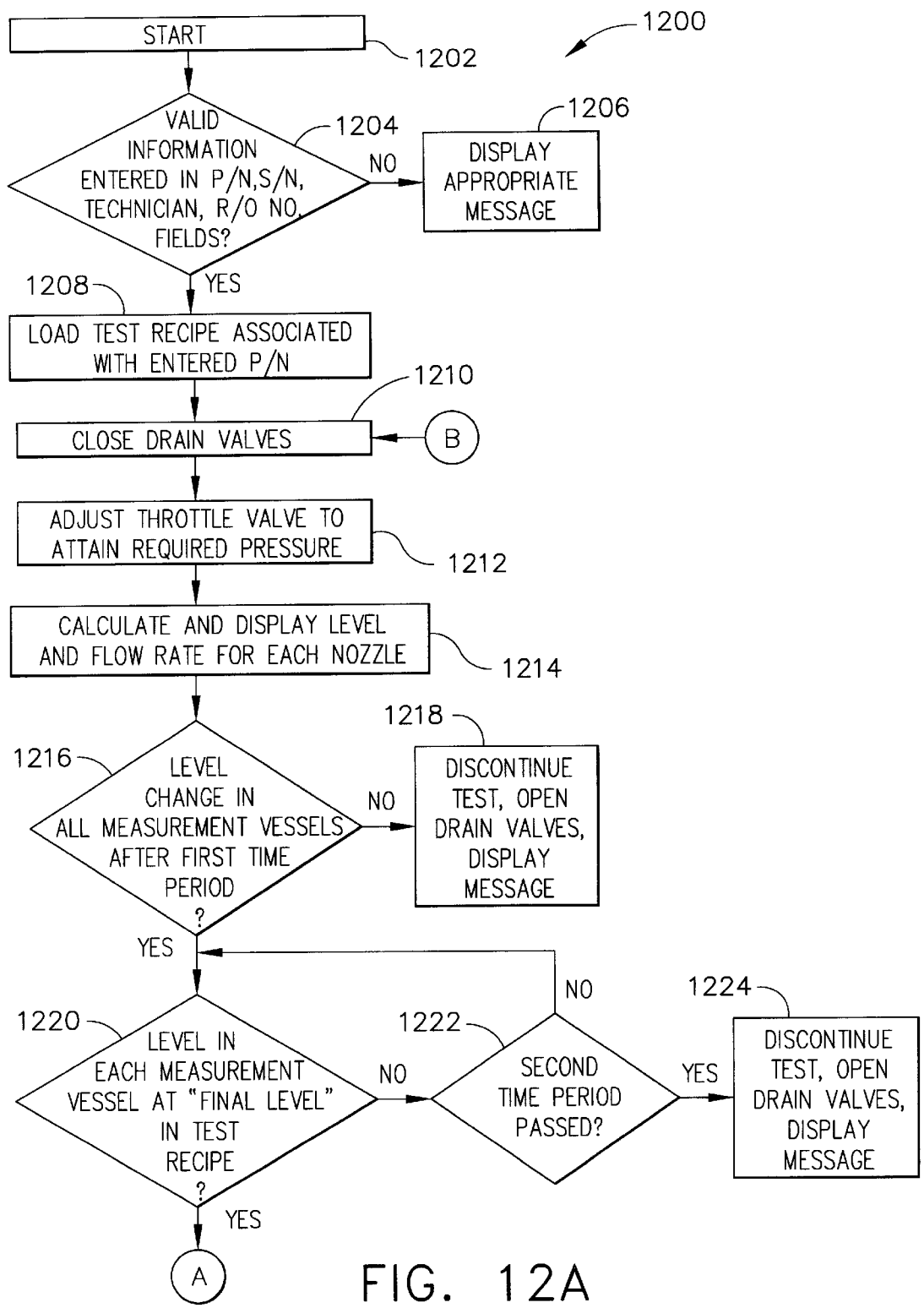
FIGS. 12A and 12B depict a process for testing jet engine fuel manifold flow distribution using the machine depicted in FIG. 3.
Figure 12B:
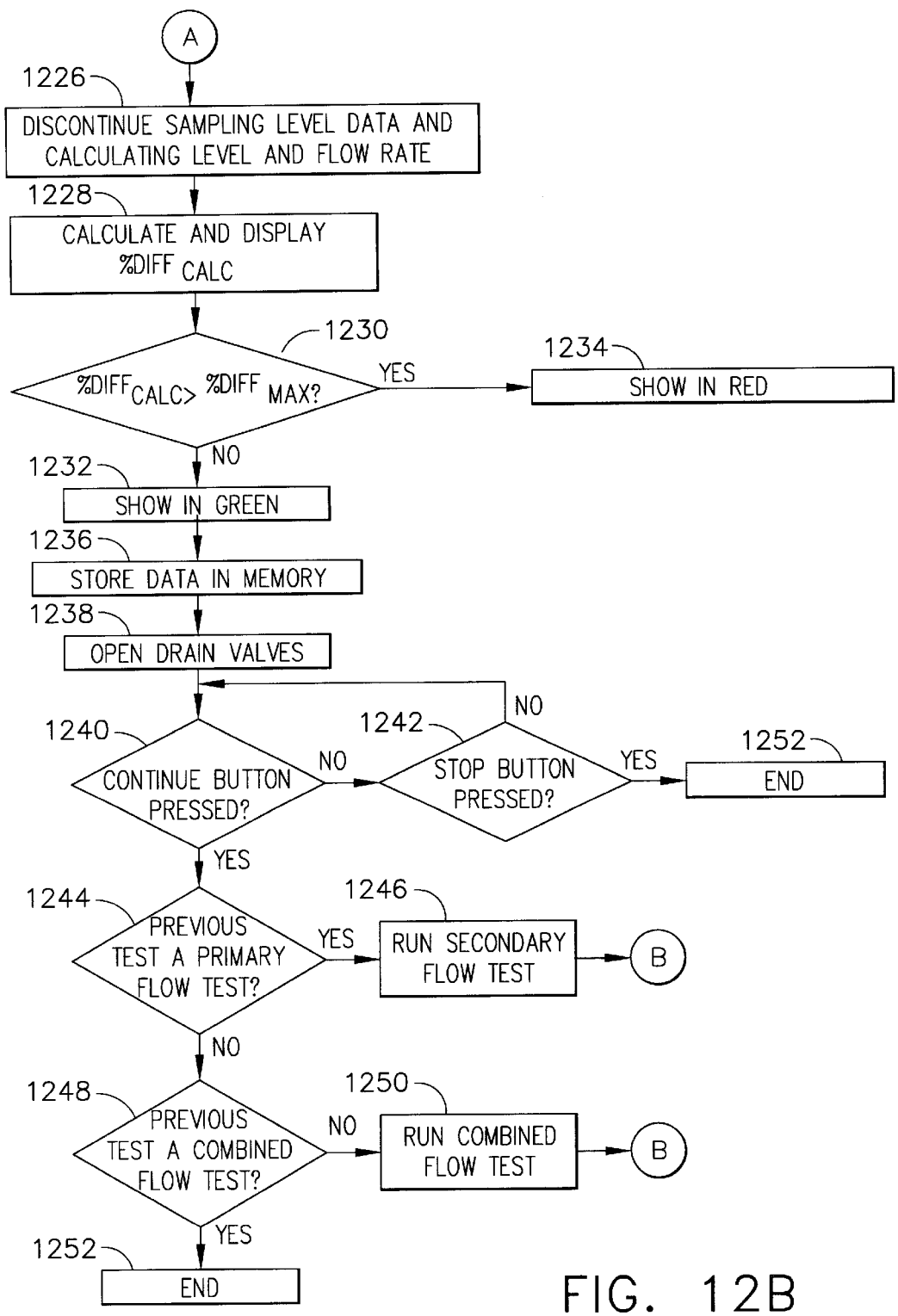

The discussion of the process depicted in FIG. 12 is predicated on the fact that a fuel nozzle has been installed in the flow test unit 304, as described above. After the operator properly installs the fuel nozzle assembly 200, he/she then enters the appropriate part number, serial number, and his/her name in the appropriate fields, and turns the pump 406 on by pressing the Pump On/Off button 1138.

When the operator presses the START button 1114, the process 1200 carried out by the software begins (STEP 1202). At this point, the software checks the P/N field 1102, S/N field 1104, Technician field 11106, and R/O No. field 1108 for valid data (STEP 1204). If the information entered in these fields is invalid, a message is displayed on the user interface screen 1100 to alert the operator (STEP 1206). If, on the other hand, the information is valid, the process proceeds to the next step.

In the next step, the computer 702 retrieves the appropriate test recipe from the test recipe database (STEP 1208). It will be recalled that the test recipe database includes a test recipe for each valid part number entered in the P/N field 1102. After the test recipe is loaded, the computer 702 positions the valve 514 so that the drain valves 510 move to the shut position (STEP 1210). The appropriate isolation valve 413 (415) is opened, and the appropriate throttle valves 417, 419 (421, 423) are then opened and adjusted until the pressure in the primary (secondary) supply line 416 (418) reaches the required magnitude, as sensed by the first (second) pressure sensor 432 (434) (STEP 1212). At this point, test fluid is flowing through each of the nozzles 114a–l and is being collected in each of the measurement vessels 308. It will be appreciated that in an alternative embodiment, in which the throttle valves 417, 419 are manually-operated, these valves will be adjusted before the START button 1114 is pressed.

In any case, after the drain valves 510 are shut and the supply pressure is adjusted, the computer begins sampling the level signals from each of the level sensors 636. Using the sampled level signals, the computer 702 calculates and displays the test fluid volume collected in each of measurement vessels 308 both numerically (in the numeric Level field 1152) and graphically (in the graphic Level field 1158) (STEP 1214). The computer 702 monitors each of the measurement vessel levels and determines if all of the level sensors 636 indicate a change in measurement vessel level after a first predetermined time period (STEP 1216). If not all of the level sensors 636 indicate a change, it is an indication of a potential fault, either mechanical or electrical in nature. As a result the test is discontinued, the drain valves 514 are opened, and an appropriate message is displayed on the user interface screen 1200 (STEP 1218).

If all of the level sensors 636 indicate a level change, the test fluid flow into the measurement vessels 308 continues, and then when each of the measurement vessels 308 has collected a first predetermined volume of test fluid, as set in the test recipe, the test fluid volume in each of the measurement vessels 308 at that point in time is displayed in the Initial field 1154, and the nozzle flow test portion begins. The test fluid continues to flow through the fuel nozzles 114a–l and into the measurement vessels 308 until one of two events occur. These events are either a second or "final" predetermined test fluid volume is collected in each measurement vessel 308 (STEP 1220), or a second predetermined time period has passed since each measurement vessel 308 collected the first predetermined test fluid volume (STEP 1222). If the second predetermined time period has passed and the second predetermined test fluid volume has not been collected, this is indicative of a potential fault as well. As a result, the test is discontinued, the drain valves are open, and an appropriate message is displayed on the user interface screen 1200 (STEP 1224).

Once each of the measurement vessels 308 collects the second predetermined volume of test fluid before the second predetermined time period has elapsed, the computer 702 in the control unit 306 stops sampling the signals from each of the level sensors 636 (STEP 1226) and calculates and displays the maximum flow rate variation (%$\text{Diff}_{calc}$) between each of the fuel nozzles 114a–l in the result field 1164 (STEP 1230). In a preferred embodiment, if the calculated maximum flow rate variation is within the value indicated in the tolerance field 1162, then the result field 1164 is highlighted in green (STEP 1232) and the PASS/FAIL indicator 1170 displays PASS. Conversely, if the maximum calculated flow rate variation exceeds the value in the tolerance field 1162, then the result field 1164 is highlighted in red (STEP 1038) and the PASS/FAIL indicator 1170 displays FAIL. It is to be appreciated that other methods of indicating a failed test could also be used, such as different colors, the sounding of an alarm, or a separate message altogether. In any case, the data from the test is then stored in memory (STEP 1236), and the drain valves are opened (STEP 1238).

After the primary flow test, the operator can stop the testing by pressing the STOP button 1118 (STEP 1240), or proceed to the next test by clicking on the CONTINUE button 1116 (STEP 1242). Should the operator click on the CONTINUE button 1116, the computer 702 in the control unit 306 would initiate the secondary flow test, since the previous test was a primary flow test (STEPS 1244–1246). The secondary flow test is conducted similar to the primary flow test except that the primary shut off valve 413 is shut and the secondary shut off valve 415 is opened; and the secondary throttle valves 421, 423 are adjusted to the pressure in the test recipe (STEPS 1210–1238). Thus, test fluid flows only into the secondary inlet ports 216.

Upon completion of the secondary flow test, the operator may once again stop the testing by pressing the STOP button 1118 (STEP 1240), or proceed to the next test by clicking on the CONTINUE button 1116 (STEP 1242). This time, if the operator clicking on the CONTINUE button 1116, the computer 702 initiates the combined flow test, since the previous test was a secondary flow test (STEPS 1248–1250). The combined flow test is conducted similar to the primary and secondary flow tests except that both the primary 413 and secondary 415 shut off valves are open, and all of the throttle valves 417, 419, 421, 423 are adjusted to the pressure in the test recipe (STEPS 1210–1238). Thus, test fluid flows into both the primary 212 and secondary 216 inlet ports.

Once the combined flow test is completed the test sequence ends (STEP 1252). At this point, the operator can shut the test machine 300 down or replace the manifold assembly 200 just tested with another manifold assembly 200. Although not illustrated in the process flowchart 1200, the operator may also print out the test results from the completed test sequence. A non-limiting example of the content and format of one such printout 1300 is depicted in FIG. 13.

The test machine 300, including both its hardware and software components, provide significant features and advantages over other fuel manifold test devices. Most notably, it provides increased accuracy and repeatability over other devices and methods. It provides real-time level sensing and display throughout the test, which other devices and methods do not provide. Operators can view the fuel nozzle spray patterns throughout the flow test sequence. Additionally, the test device is configured as a closed loop system.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to any particular embodiment disclosed for carrying out this invention, but that the invention includes all embodiments falling within the scope of the appended claims.

We claim:

1. An apparatus for testing fluid flow distribution through a turbine engine fuel manifold and one or more fuel nozzles connected thereto, the apparatus comprising:

a test fluid supply tank;

one or more test fluid supply lines each including a test fluid inlet in fluid communication with the test fluid supply tank and a test fluid outlet adapted to be coupled to the fuel manifold and its connected fuel nozzles;

a plurality of fluid measurement vessels each operable to receive a test fluid discharged from one of the fuel nozzles when the fuel manifold is coupled to the test fluid supply line outlet;

a plurality of level sensors individually coupled to each of the fluid measurement vessels and operable to determine a level of the test fluid therein and generate a level signal representative of the test fluid level; and a computer coupled to the one or more level sensors and operable to periodically sample each of the generated level signals and calculate test fluid flow rate through each of the fuel nozzles based on the sampled level signals.

2. The apparatus of claim 1, wherein the fuel manifold includes a primary line and a secondary line, and wherein the one or more test fluid supply lines comprises:
a primary fluid supply line adapted to be coupled to fuel manifold primary line; and
a secondary fluid supply line adapted to be coupled to the fuel manifold secondary line.

3. The apparatus of claim 1, further comprising:
a pump in fluid communication between the test fluid supply tank and the supply line inlets and operable to pump the test fluid from the test fluid supply tank through the supply lines.

4. The apparatus of claim 1, further comprising:
a display device coupled to the computer and operable to display the calculated test fluid flow rates through each of the fuel nozzles.

5. The apparatus of claim 1, further comprising:
a flow sensor in fluid communication with the one or more test fluid supply lines and electrically coupled to the computer, the flow sensor operable to generate a flow signal representative of the test fluid flow rate through the supply lines to the fuel manifold,
wherein the computer periodically samples the flow signal and determines the flow rate through the supply lines therefrom.

6. The apparatus of claim 5, further comprising:
a display device coupled to the computer and operable to display the calculated test fluid flow rates through each of the fuel nozzles and the determined fuel flow rate through the supply lines.

7. The apparatus of claim 1, further comprising:
one or more pressure sensors in fluid communication with the one or more fluid supply lines and electrically coupled to the computer, the pressure sensors each operable to generate a pressure signal representative of test fluid pressure in the supply lines,
wherein the computer periodically samples the pressure signals and determines the pressure in the supply lines therefrom.

8. The apparatus of claim 7, further comprising:
a display device coupled to the computer and operable to display the determined pressure in the supply lines.

9. The apparatus of claim 1, further comprising:
a fluid return line coupled to, and providing fluid communication between, each of the fluid measurement vessels and the test fluid supply tank.

10. The apparatus of claim 9, further comprising:
a jet pump coupled in flow-series in the fluid return line.

11. The apparatus of claim 9, further comprising:
a plurality of remotely operated drain valves individually coupled between the fluid return line and each of the fluid measurement vessels.

12. The apparatus of claim 11, wherein the drain valves are operated in response to commands issued by the computer.

13. The apparatus of claim 1, wherein each of the measurement vessels comprises:
a first vessel including a nozzle receiving portion adapted to receive one of the fuel nozzles therein; and
a second vessel in fluid communication with the first vessel, and including a sensor receiving portion adapted to receive one of the level sensors therein.

14. The apparatus of claim 13, wherein the first vessel includes a substantially transparent portion proximate the nozzle receiving portion, whereby a test fluid spray pattern from the fuel nozzle is observable.

15. The apparatus of claim 1, wherein the one or more test fluid supply lines each include an in-line valve coupled between the test fluid inlet and test fluid outlet, wherein pressure of the test fluid supplied to the fuel manifold is adjusted by operation of the in-line valves.

16. The apparatus of claim 15, wherein the one or more in-line valves are remotely operated.

17. The apparatus of claim 15, wherein the one or more remotely operated in-line valves are positioned automatically in response to commands issued by the computer.

18. The apparatus of claim 1, wherein each of the level sensors comprises:
a tube extending longitudinally within the measurement vessel;
a magnet assembly surrounding a portion of the tube, the magnet assembly emitting a magnetic field and operable to move axially along the tube in response to a changing fluid level;
a transducer electrically coupled to the tube and operable to periodically transmit electrical pulses and receive reflected pulses,
wherein the reflected pulses are generated based on interaction of the transmitted pulses with the magnetic field emitted by the magnet assembly.

19. The apparatus of claim 1, further comprising a display device operable to display the level of the test fluid in each of the fluid measurement vessels based on the generated level signals.

20. The apparatus of claim 19, wherein the test fluid levels are displayed numerically.

21. The apparatus of claim 20, wherein the test fluid levels are displayed graphically.

22. An apparatus for testing fluid flow distribution through a turbine engine fuel manifold and one or more fuel nozzles connected thereto, the apparatus comprising:
a test fluid supply tank;
one or more test fluid supply lines each including a test fluid inlet in fluid communication with the test fluid supply tank and a test fluid outlet adapted to be coupled to the fuel manifold and its connected fuel nozzles;
a plurality of fluid measurement vessels each operable to receive a test fluid discharged from one of the fuel nozzles when the fuel manifold is coupled to the test fluid supply line outlet;
a plurality of level sensors individually coupled to each of the fluid measurement vessels and operable to determine a level of the test fluid therein and generate a level signal representative of the test fluid level;
a computer coupled to the one or more level sensors and operable to periodically sample each of the generated level signals and calculate test fluid flow rate through each of the fuel nozzles based on the sampled level signals; and
a display device coupled to the computer and operable to display the calculated test fluid flow rates through each of the fuel nozzles.

23. The apparatus of claim 22, wherein the fuel manifold includes a primary line and a secondary line, and wherein the one or more test fluid supply lines comprises:
a primary fluid supply line adapted to be coupled to fuel manifold primary line; and a secondary fluid supply line adapted to be coupled to the fuel manifold secondary line.

24. The apparatus of claim 22, further comprising:
a pump in fluid communication between the test fluid supply tank and the supply line inlets and operable to pump the test fluid from the test fluid supply tank through the supply lines.

25. The apparatus of claim 22, further comprising:
a flow sensor in fluid communication with the one or more test fluid supply lines and electrically coupled to the computer, the flow sensor operable to generate a flow signal representative of the test fluid flow rate through the supply lines to the fuel manifold,
wherein the computer periodically samples the flow signal and determines the flow rate through the supply lines therefrom.

26. The apparatus of claim 25, further comprising:
a display device coupled to the computer and operable to display the calculated test fluid flow rates through each of the fuel nozzles and the determined fuel flow rate through the supply lines.

27. The apparatus of claim 22, further comprising:
one or more pressure sensors in fluid communication with the one or more fluid supply lines and electrically coupled to the computer, the pressure sensors each operable to generate a pressure signal representative of test fluid pressure in the supply lines,
wherein the computer periodically samples the pressure signals and determines the pressure in the supply lines therefrom.

28. The apparatus of claim 27, further comprising:
a display device coupled to the computer and operable to display the determined pressure in the supply lines.

29. The apparatus of claim 22, further comprising:
a fluid return line coupled to, and providing fluid communication between, each of the fluid measurement vessels and the test fluid supply tank.

30. The apparatus of claim 29, further comprising:
a jet pump coupled in flow-series in the fluid return line.

31. The apparatus of claim 29, further comprising:
a plurality of remotely operated drain valves individually coupled between the fluid return line and each of the fluid measurement vessels.

32. The apparatus of claim 31, wherein the drain valves are operated in response to commands issued by the computer.

33. The apparatus of claim 22, wherein each of the measurement vessels comprises:
a first vessel including a nozzle receiving portion adapted to receive one of the fuel nozzles therein; and
a second vessel in fluid communication with the first vessel, and including a sensor receiving portion adapted to receive one of the level sensors therein.

34. The apparatus of claim 33, wherein the first vessel includes a substantially transparent portion proximate the nozzle receiving portion, whereby a test fluid spray pattern from the fuel nozzle is observable.

35. The apparatus of claim 22, wherein the one or more test fluid supply lines each include an in-line valve coupled between the test fluid inlet and test fluid outlet, wherein pressure of the test fluid supplied to the fuel manifold is adjusted by operation of the in-line valves.

36. The apparatus of claim 35, wherein the one or more in-line valves are remotely operated.

37. The apparatus of claim 36, wherein the one or more remotely operated in-line valves are positioned automatically in response to commands issued by the computer.

38. The apparatus of claim 22, wherein each of the level sensors comprises:
a tube extending longitudinally within the measurement vessel;
a magnet assembly surrounding a portion of the tube, the magnet assembly emitting a magnetic field and operable to move axially along the tube in response to a changing fluid level;
a transducer electrically coupled to the tube and operable to periodically transmit electrical pulses and receive reflected pulses,
wherein the reflected pulses are generated based on interaction of the transmitted pulses with the magnetic field emitted by the magnet assembly.

39. The apparatus of claim 22, further comprising a display device operable to display the level of the test fluid in each of the fluid measurement vessels based on the generated level signals.

40. The apparatus of claim 39, wherein the test fluid levels are displayed numerically.

41. The apparatus of claim 40, wherein the test fluid levels are displayed graphically.

42. An apparatus for testing fluid flow distribution through a turbine engine fuel manifold and one or more fuel nozzles connected thereto, the apparatus comprising:
a test fluid supply tank;
one or more test fluid supply lines each including a test fluid inlet in fluid communication with the test fluid supply tank and a test fluid outlet adapted to be coupled to the fuel manifold and its connected fuel nozzles;
a plurality of fluid measurement vessels each operable to receive a test fluid discharged from one of the fuel nozzles when the fuel manifold is coupled to the test fluid supply line outlet;
a plurality of level sensors individually coupled to each of the fluid measurement vessels and operable to determine a level of the test fluid therein and generate a level signal representative of the test fluid level;
a computer coupled to the one or more level sensors and operable to periodically sample each of the generated level signals and calculate test fluid flow rate through each of the fuel nozzles based on the sampled level signals; and
a display device coupled to the computer and operable to display (i) the calculated test fluid flow rates through each of the fuel nozzles and (ii) the test fluid levels both numerically and graphically.

43. A method of testing fluid flow distribution through a turbine engine fuel manifold and one or more fuel nozzles connected thereto, the apparatus comprising:
supplying a test fluid to the fuel manifold at a predetermined pressure;
collecting the test fluid discharged from each of the fuel nozzles in separate measurement vessels;
periodically determining a volume of test fluid discharged from each of the fuel nozzles until each of the measurement vessels have collected a predetermined volume of the test fluid; and
periodically calculating test fluid flow rate through each of the fuel nozzles based on the periodically determined test fluid discharge volume.

44. The method of claim 43, further comprising:

determining a variation between the test fluid flow rates through each of the fuel nozzles.

45. The method of claim 44, wherein the determination of test fluid flow rate variation comprises determining a maximum variation.

46. The method of claim 45, wherein the determination of maximum flow rate variation comprises:

subtracting a minimum fuel nozzle flow rate from a maximum fuel nozzle flow rate to obtain a difference;

determining a median fuel nozzle flow rate through each of the fuel nozzles; and dividing the difference by the determined median.

47. The method of claim 43, wherein the tested fuel manifold and nozzles each include a primary and a secondary flow path, and wherein the method further comprises:

supplying the test fluid at the predetermined pressure to only the fuel manifold and nozzle primary flow paths.

48. The method of claim 47, further comprising:

supplying the test fluid at the predetermined pressure to only the fuel manifold and nozzle secondary flow paths.

49. The method of claim 47, further comprising:

simultaneously supplying the test fluid at the predetermined pressure to the fuel manifold and nozzle primary and secondary flow paths.

50. The method of claim 43, further comprising:

observing a spray pattern of the test fluid discharged from each of the nozzles.

51. The method of claim 43, wherein the test fluid volume is periodically determined based on a periodically determined test fluid level in each of the measurement vessels.

52. The method of claim 43, further comprising:

displaying the periodically calculated test fluid flow rates through each of the fuel nozzles.

53. The method of claim 43, further comprising:

displaying the periodically determined test fluid volumes discharged from each of the fuel nozzles.

54. The method of claim 53, wherein the periodically determined test fluid volumes are displayed numerically and graphically.

* * * * *